(12) United States Patent
De Souza Cunha et al.

(10) Patent No.: US 12,507,708 B2
(45) Date of Patent: Dec. 30, 2025

(54) METHOD OF EXTRACTION OF NATURAL CAFFEINE FROM A CAFFEINE CONTAINING BIOLOGICAL MATERIAL

(71) Applicant: Givaudan SA, Vernier (CH)

(72) Inventors: Luciana Andreia De Souza Cunha, Botucatu (BR); Fabio Magalhaes De Mello, Sao Paolo (BR); Karl Chevalier, Salon de Provence (FR)

(73) Assignee: GIVAUDAN SA, Vernier (CH)

( * ) Notice: Subject to any disclaimer, the term of this patent is extended or adjusted under 35 U.S.C. 154(b) by 302 days.

(21) Appl. No.: 18/018,334

(22) PCT Filed: Jul. 13, 2021

(86) PCT No.: PCT/EP2021/069500
§ 371 (c)(1),
(2) Date: Jan. 27, 2023

(87) PCT Pub. No.: WO2022/028824
PCT Pub. Date: Feb. 10, 2022

(65) Prior Publication Data
US 2023/0284648 A1 Sep. 14, 2023

(30) Foreign Application Priority Data
Aug. 7, 2020 (GB) .................................... 2012338

(51) Int. Cl.
A23F 5/22 (2006.01)
A23F 3/18 (2006.01)

(52) U.S. Cl.
CPC ............... *A23F 5/226* (2013.01); *A23F 3/18* (2013.01)

(58) Field of Classification Search
CPC ....................................................... A23F 3/18
See application file for complete search history.

(56) References Cited

U.S. PATENT DOCUMENTS

| 3,940,498 A | 2/1976 | Butterworth et al. |
| 3,958,023 A | 5/1976 | Butterworth |
| 5,399,688 A * | 3/1995 | Sipos ...................... A23F 5/223 544/275 |
| 2021/0235717 A1 | 8/2021 | De Jesus Fernandes Puga et al. |

FOREIGN PATENT DOCUMENTS

| CN | 1047017 | * 11/1990 |
| CN | 1082332 | * 2/1994 |
| EP | 1690457 A1 | 8/2006 |
| WO | WO2004028550 | * 4/2004 |
| WO | 2008051170 A2 | 5/2008 |
| WO | 2019209127 A1 | 10/2019 |

OTHER PUBLICATIONS

Translation of CN1047017 published Nov. 21, 1990.*
Translation for CN1082332 published Feb. 23, 1994.*
(Continued)

*Primary Examiner* — Hong T Yoo
(74) *Attorney, Agent, or Firm* — Curatolo Sidoti & Trillis Co., LPA; Floyd Trillis, III; Salvatore A. Sidoti

(57) ABSTRACT

The present invention relates to the methods for extraction of natural caffeine from caffeine containing biological material.

16 Claims, 13 Drawing Sheets

Process flowchart.

(56) References Cited

OTHER PUBLICATIONS

Partial Translation of Ribiero et al, Brazillian Journal of Food Technology, vol. 15, No. 3.*

International Search Report for App. No. PCT/EP2021/069500 dated Nov. 4, 2021.

Written Opinion for App. No. PCT/EP2021/069500 dated Nov. 4, 2021.

Great Britain Search Report for App. No. 2012338.6 dated Jan. 22, 2021.

Edwards, et al., "FT-Raman spectroscopic studies of guarana and some extracts", Analytica Chimica Acta, Amsterdam, V. 532, pp. 177-186, 2005.

Ribeiro, et al., "Production of caffeine-rich guarana extracts using an enzymatic process and tannin adsorption", Brazilian Journal of Food Technology, vol. 15, No. 3, pp. 261-270, 2012.

Grases, et al., "Theobromine Inhibits Uric Acid Crystallization. A Potential Application in the Treatment of Uric Acid Nephrolithiasis", PloS one, 2014.

Pagliarussi, et al., "Fluid Bed Drying of Guarana (Paullinia cupana HBK) Extract: Effect of Process Factors on Caffeine Content", AAPS PharmSciTech, New York, V. 7, No. 2, pp. E1-E6, Article 54, 2006.

Zi Chengting, et al., "Comparison and analysis of extraction technologies of natural caffeine from tea leaves", Gongdong Chemicals, vol. 46, No. 6, pp. 73-77, May 30, 2019.

Zhu Jianguang et al., "Organic Chemistry", Metallurgical Industry Press, p. 272, Sep. 30, 1979.

\* cited by examiner

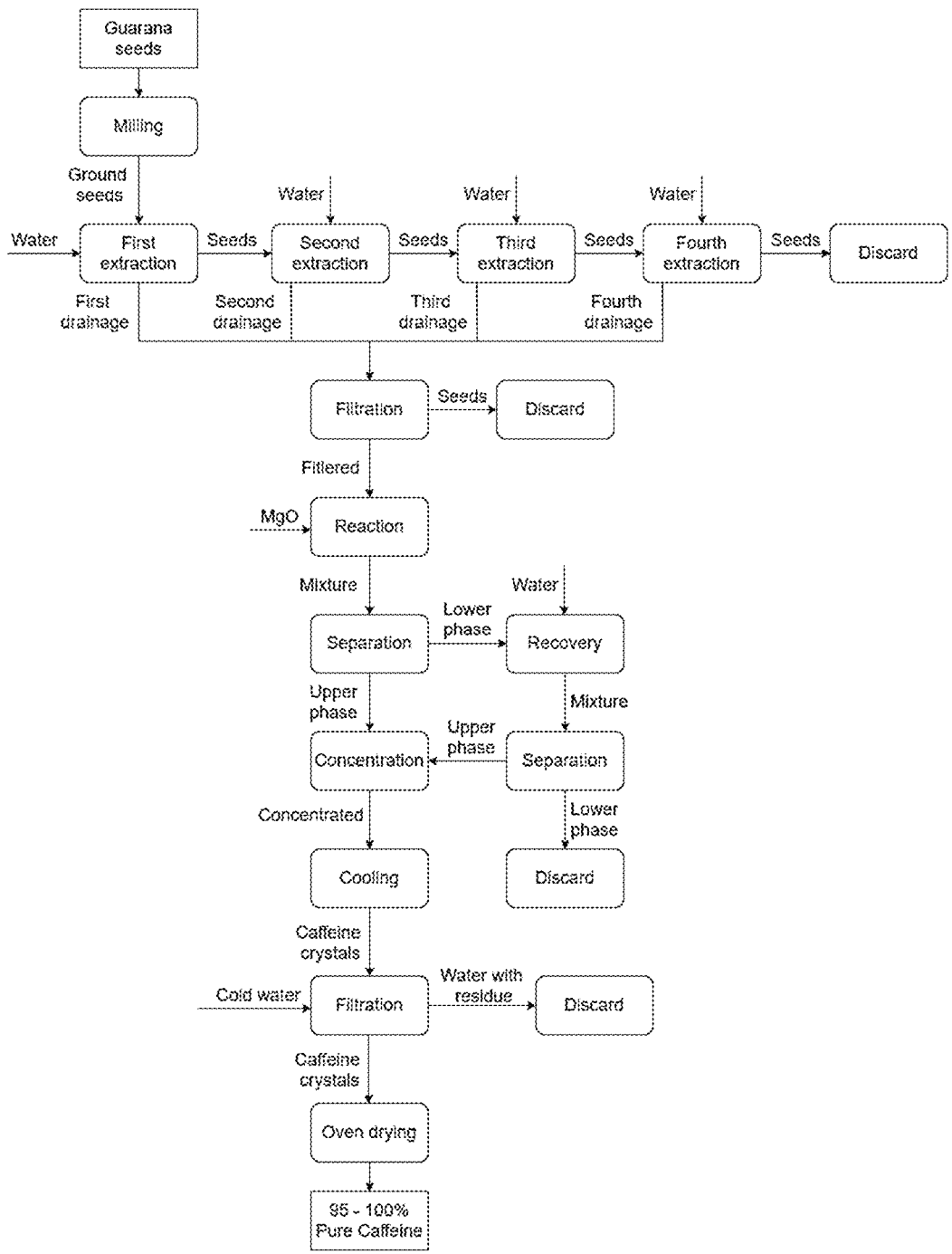
Figure 1 – Process flowchart.

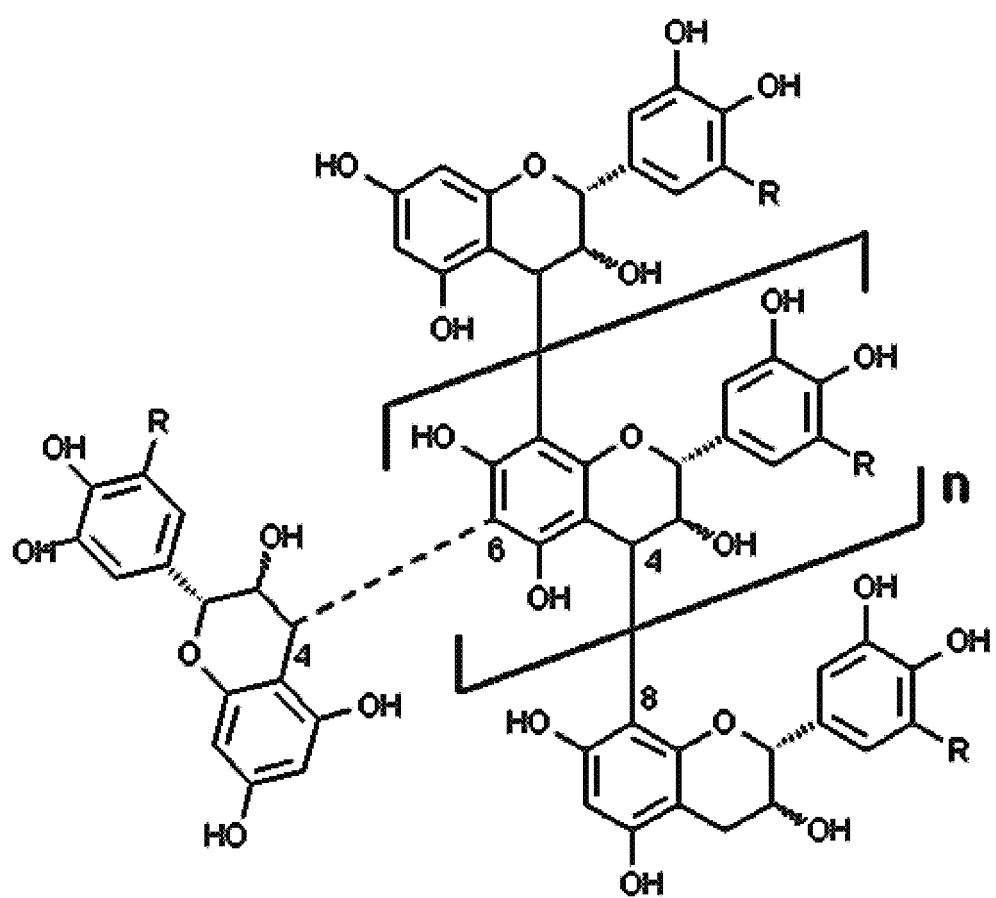
Figure 2 – Condensed tannin molecule (ATTWOOD, CAMMACK; 2006)

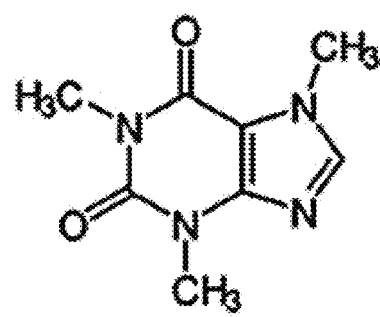
CAFFEINE
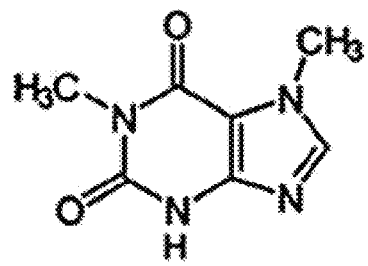
PARAXANTINE
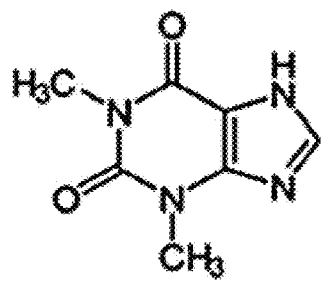
THEOPHYLLINE
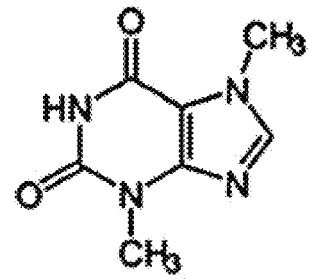
THEOBROMINE
Figure 3 – Caffeine molecules (GRASES, RODRIGUEZ, COSTA-BAUZA; 2014)

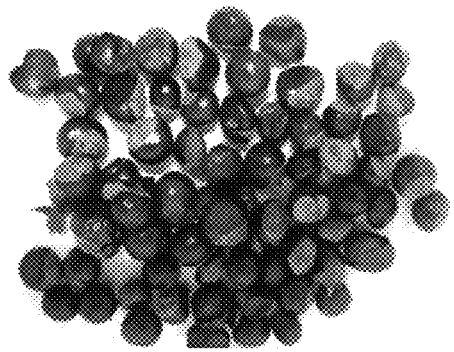
Figure 4a – Raw material: guarana seeds.
Figure 4b – Raw material after milling in 3mm sieve.
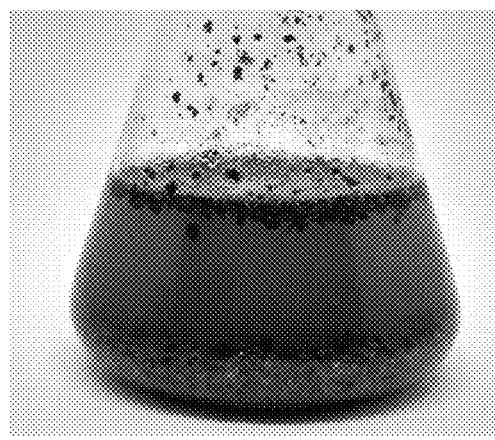
Figure 4c – Raw material with water: before extraction.

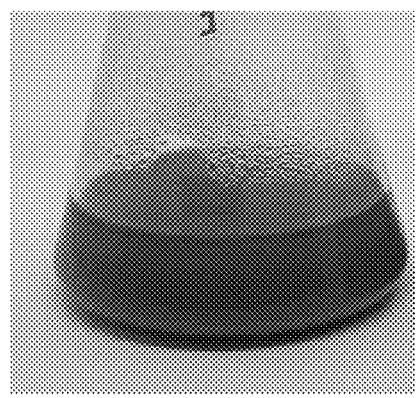
Figure 5a – Drainage: 1st extraction.
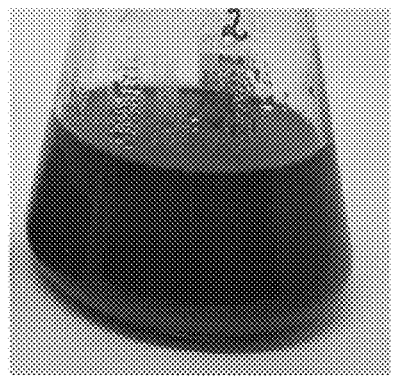
Figure 5b – Drainage: 2nd extraction.
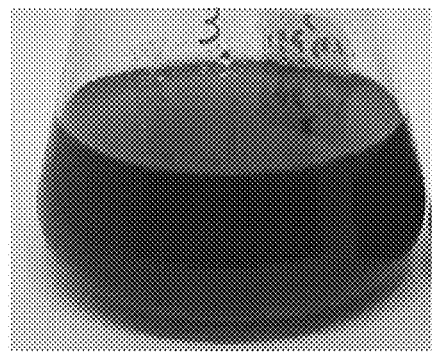
Figure 5c – Drainage: 3rd extraction.
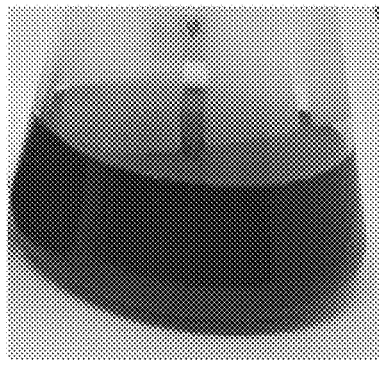
Figure 5d – Drainage: 4th extraction.

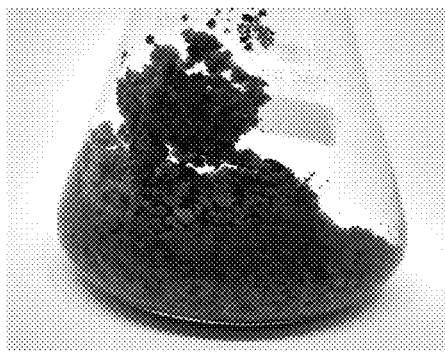
Figure 6a – Seeds after 4 extraction.
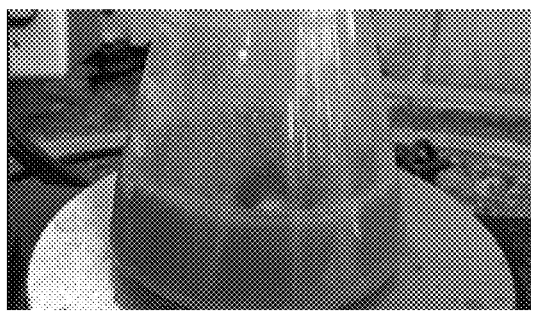
Figure 6b – Drainage with MgO.
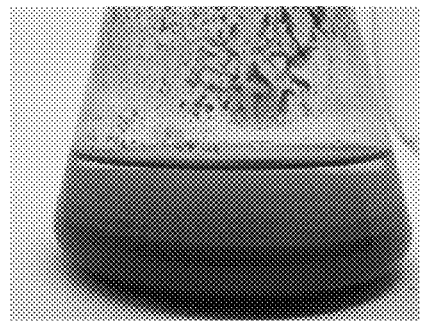
Figure 6c – Separation after the reaction.
Figure 6d – Separation after the recovery.

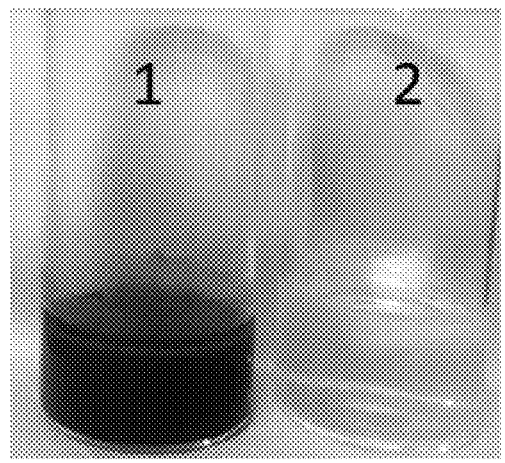
Figure 7a – Two phases after separation: 1 - sludge and 2 – supernatant.
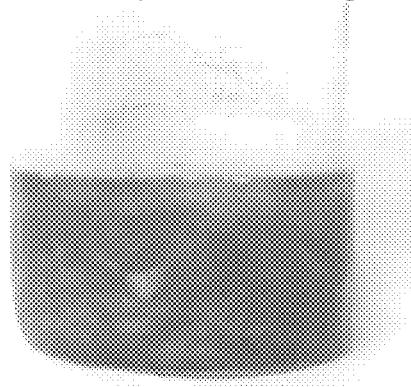
Figure 7b – After concentration (8 – 10% of total solids)
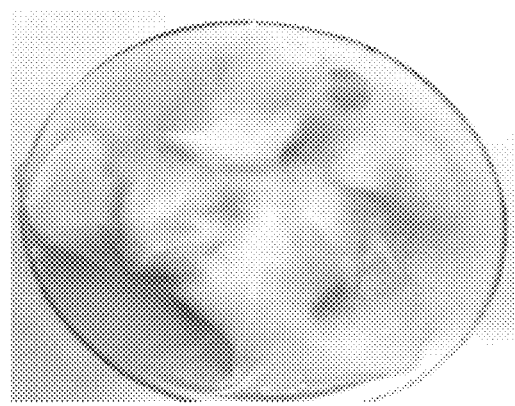
Figure 7c – Crystal after washing with water.

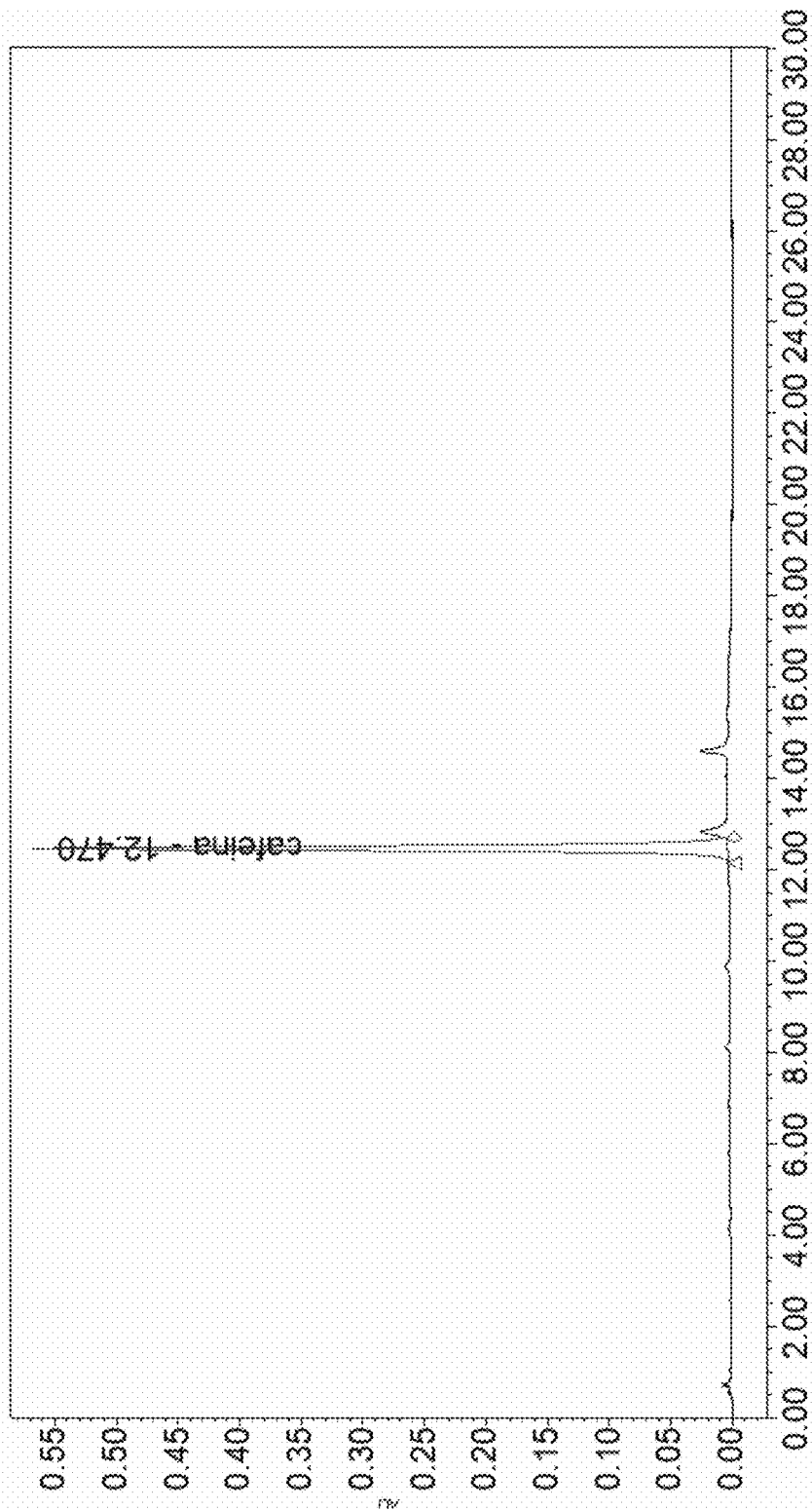
Figure 8 – Guarana seeds chromatogram in 270nm.

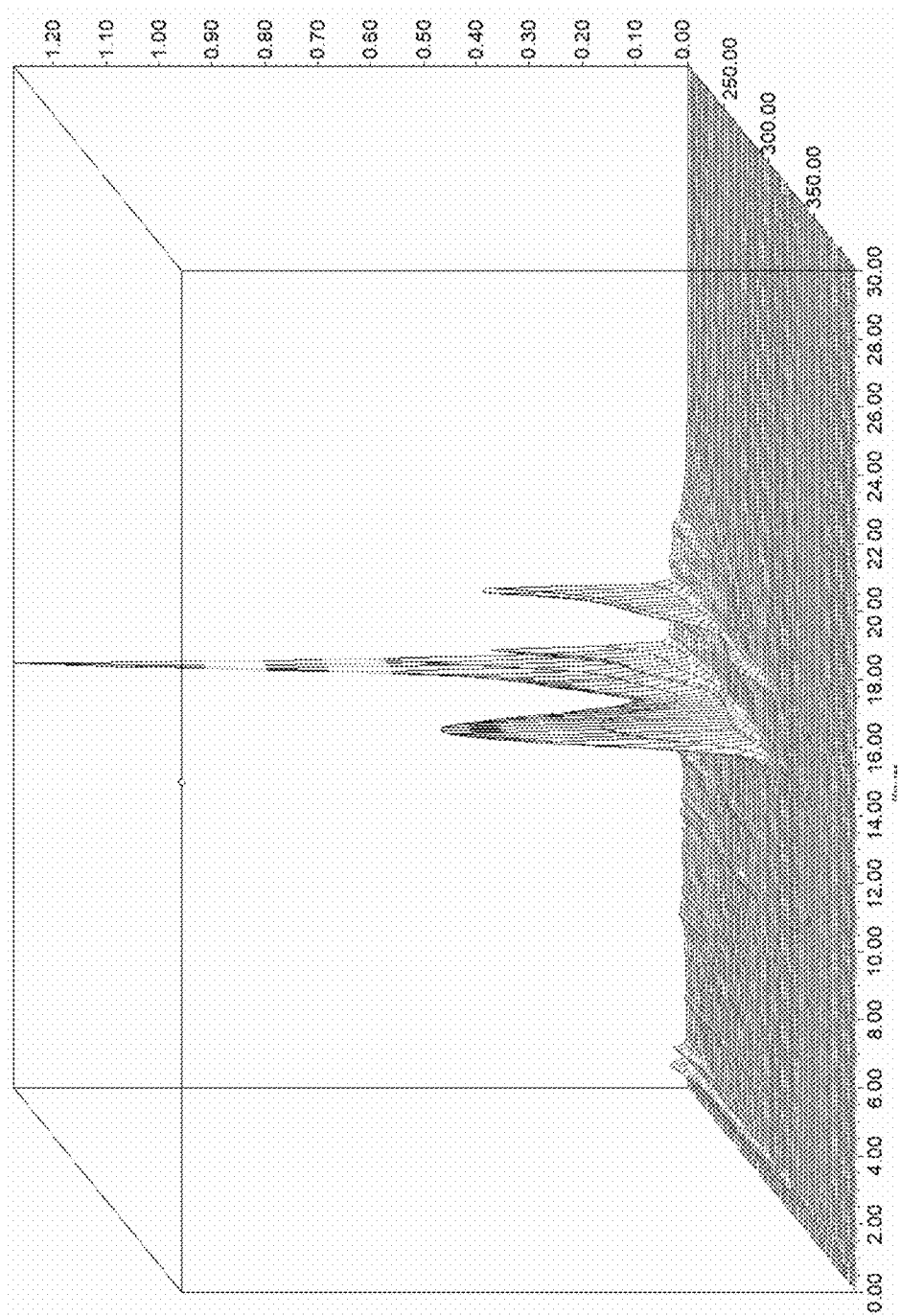
Figure 9 – Guarana seeds scanning chromatogram from 200 to 400nm

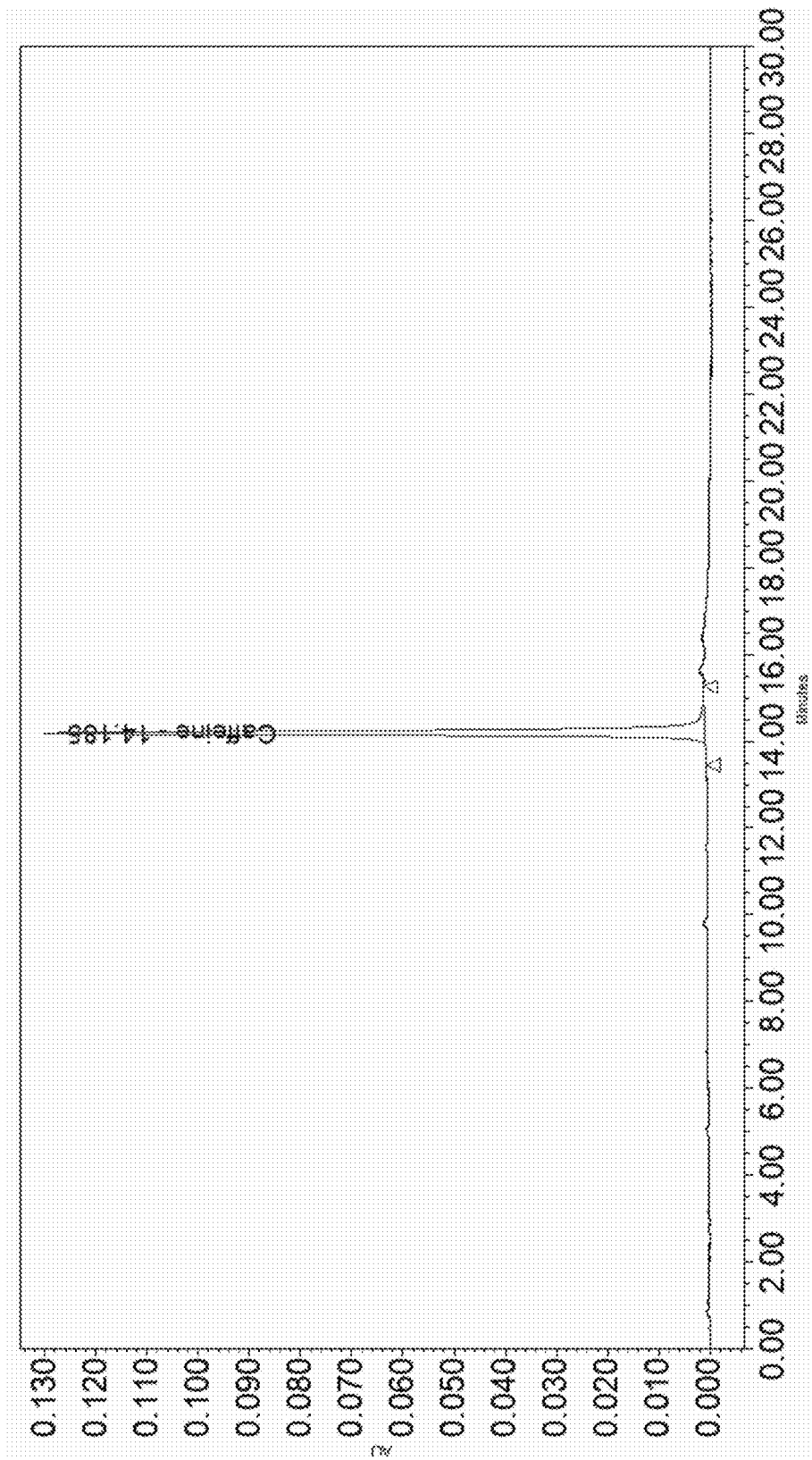
Figure 10 – Drainage chromatogram in 270nm

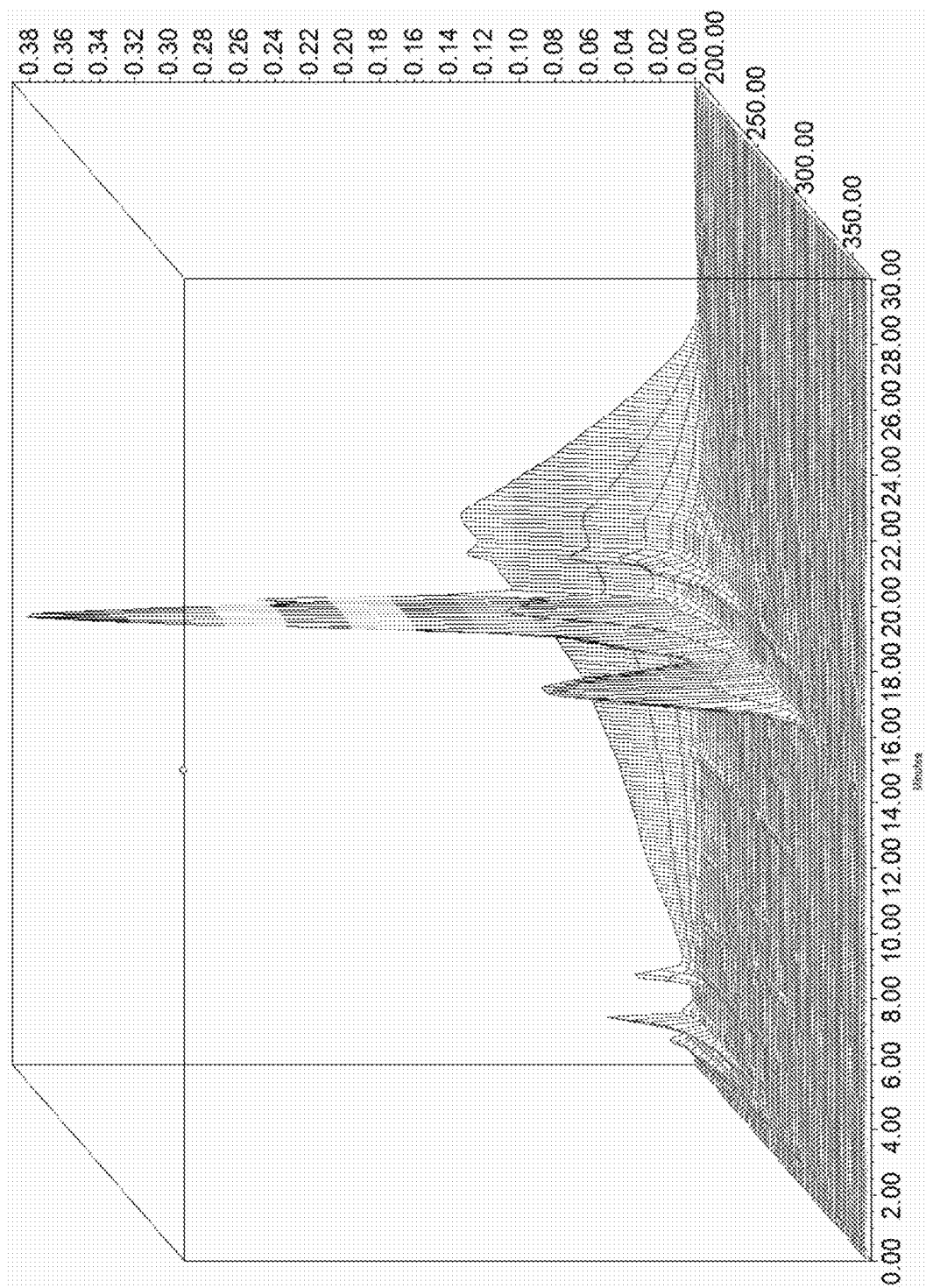
Figure 11 – Drainage scanning chromatogram from 200 to 400nm

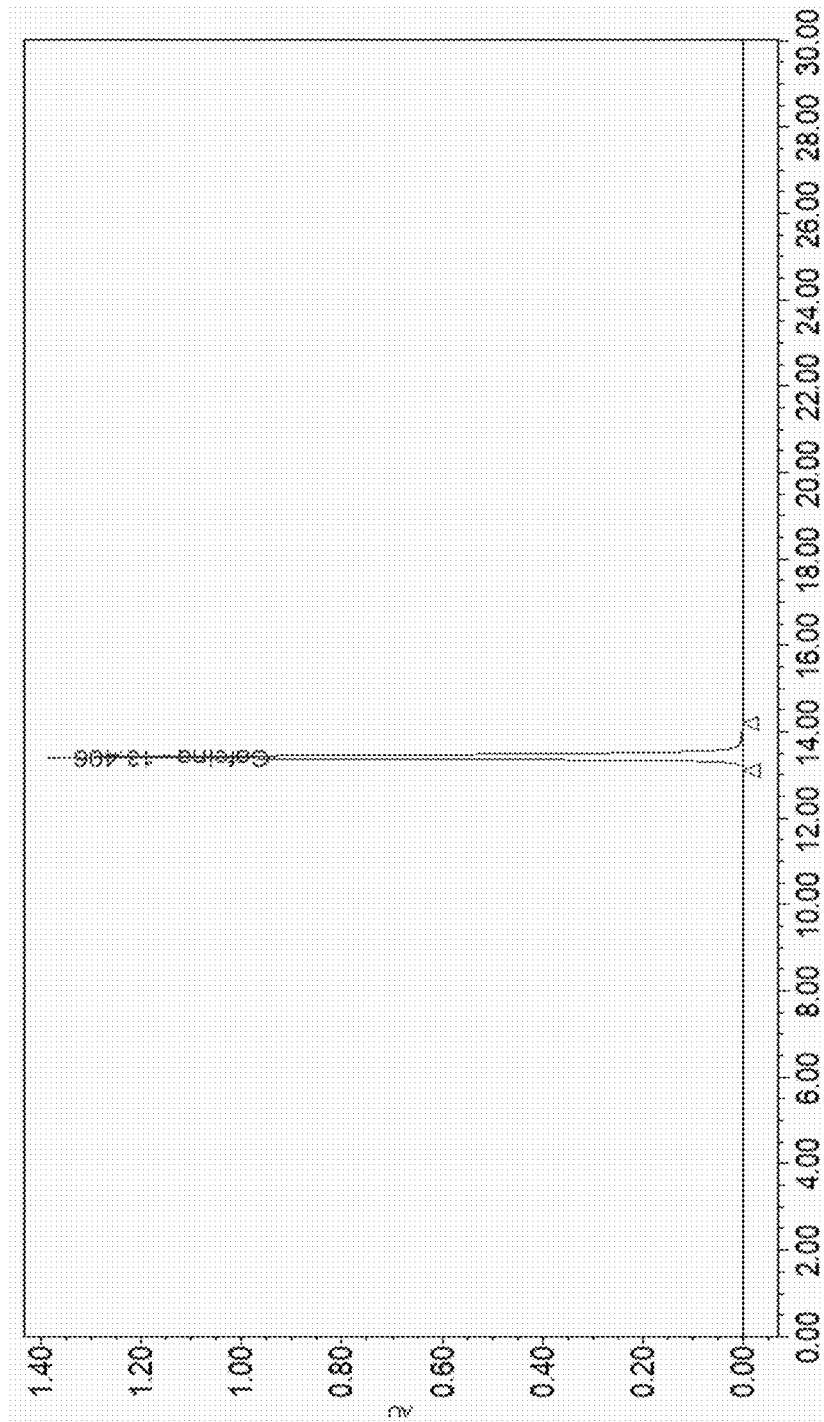
Figure 12 – Purified caffeine chromatogram in 270nm.

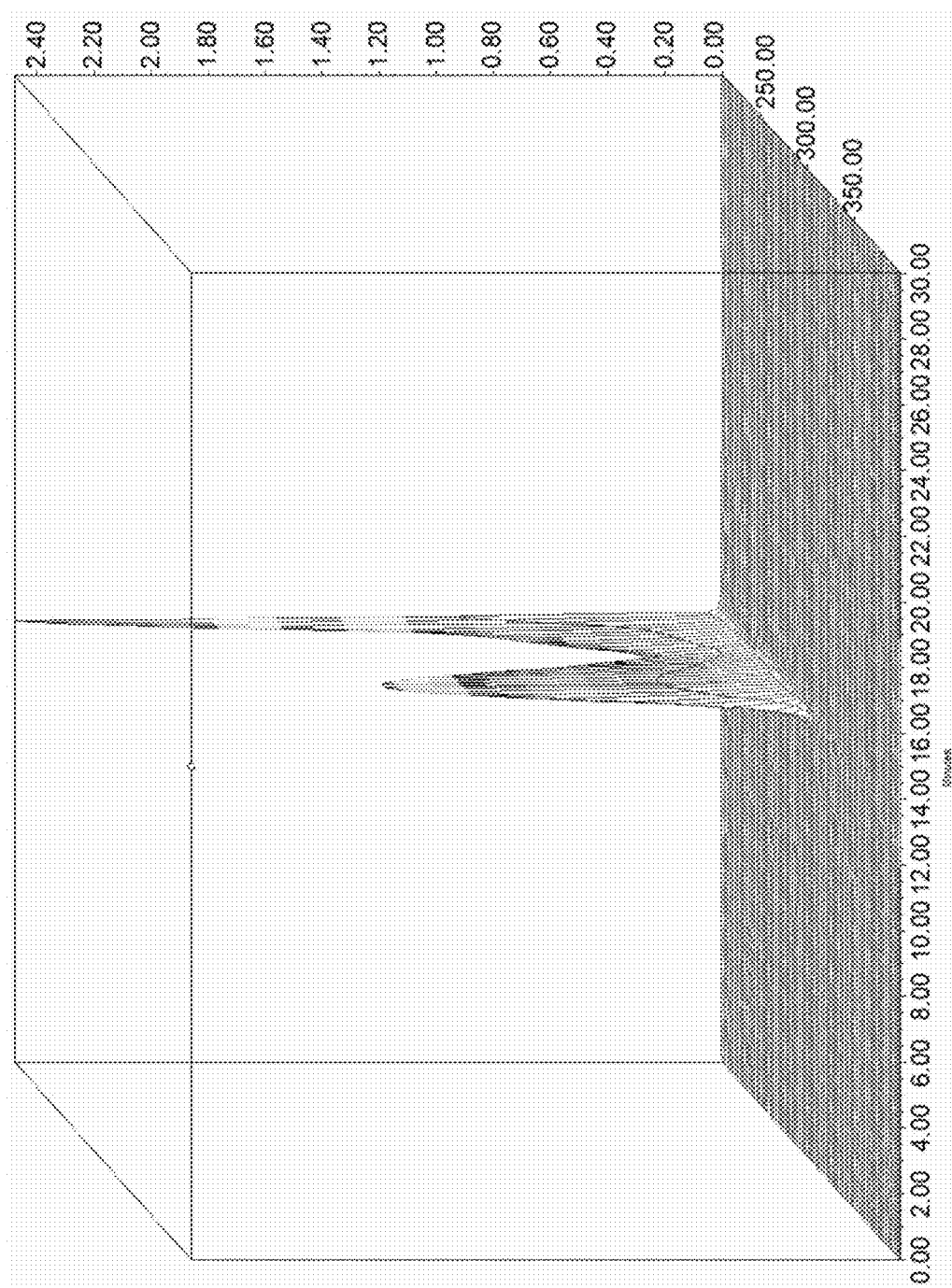
Figure 13 – Purified caffeine scanning chromatogram from 200 to 400nm.

METHOD OF EXTRACTION OF NATURAL CAFFEINE FROM A CAFFEINE CONTAINING BIOLOGICAL MATERIAL

CROSS REFERENCE TO RELATED APPLICATIONS

This application is a national stage application of International Application No. PCT/EP2021/069500, filed on 13 Jul. 2021, which claims priority from Great Britain Patent Application No. 2012338.6, filed on 7 Aug. 2020, which applications are incorporated herein by reference.

FIELD OF THE INVENTION

The present invention relates to the methods for extraction of natural caffeine from caffeine containing biological material.

BACKGROUND OF THE INVENTION

Caffeine is a physiologically active component in coffee, which has been studied intensively. It was discovered by Runge in 1820. The chemical name of this purine is 1.3.7 trimethylaxanthine. It is characterized as needle-shaped crystals with a melting point of 236° C. It is present in several plants like coffee, tea and guarana. Coffee beans contain between 0.8 and 2.8% caffeine, depending on species and origin.

Currently, there is a great demand for natural ingredients and the discrimination among natural and synthetic caffeine has attracted enormous attention. In the past few years, the Food and Drug Administration (FDA) regulated that any added caffeine must be labelled on products for human consumption owing to possible adulteration and health concerns. Actually, caffeine extraction (essentially for decaffeination purposes and human intake) is carried out using supercritical carbon dioxide or related mixtures making use of cosolvents, such as alcohols and water, to improve the extraction yields. Other conventional methods include the extraction of caffeine by water at high temperatures, the use of organic solvents, namely chloroform, methylene chloride and ethyl acetate, and the use of water-organic solvent mixtures (water-ethanol, water-methanol and water-acetone). These methods have some disadvantages since they require several hours of extraction and result in low yields of caffeine. Furthermore, the organic compounds commonly employed are volatile, toxic and flammable leading to several human risks and safety issues and to a poor environmental performance. For example WO2019/209127 describes a solvent free method of extracting caffeine using an ultrasonic extraction cell.

The guarana (*Paullinia cupana* Kunth ex H.B.K. var *sorbilis* (Mart.) Ducke, Sapindaceae family) is a woody creeper original from Central Amazon, which can become 10 m high, generating bunches with until 50 fruits, each with one to three seeds. These have great value by its high caffeine content that can varies from 2.5 to 6% and for its stimulating effects when consumed as beverages; possess astringent and antioxidant properties as well due to the presence of condensed tannins or proanthocyanidins which are catechins and/or epicatechins polymers. (SIMÕES et al., 2003). The caffeine content in guarana is significantly higher (4 times) than it is in coffee, 10 times higher than it is in tea and 39 times higher than cacao. (EDWARDS et al., 2005). Beyond that, guarana seeds are constituted by polysaccharides as starch, cellulose, pectin, mucilage, protein and oil, as well as theophylline, theobromine and saponins (SIMÕES et al., 2003; HEARD et al., 2006).

The traditional and more used method to produce guarana extracts is based in direct extraction of the seeds in a hydroalcoholic solution. The extract obtained by conventional process, however, results in a dark brown solution being rich in caffeine and tannins. This is due to formation of a complex between caffeine and tannins by hydrophobic interaction and hydrogenic bond between nitrogen atom not methylated in caffeine's imidazole ring and tannin's hydroxyl group (SPENCER et al., 1988; EDWARDS et al., 2005). So, using these guarana extracts in higher concentrations is limited due to the high concentration of tannins which are not desirable because of its bitterness and astringency (HENMAN, 1982).

To disrupt the caffeine-tannins complex, some strategies can be done as the use of selective solvents in the caffeine extraction as supercritical fluid or methylene chloride (MEHR et al., 1996; HULBERT et al., 1998; SALDAÑA et al., 2002), or switching caffeine by another component in the complex that has more affinity with condensed tannins as proteins (SPENCER et al., 1988; KAWAMOTO et al., 1996), metallic ions (SIMÕES et al., 2003) and polymers (MAKKAR et al., 1995).

The guarana extract production involving an enzymatic hydrolyses step was recently presented by Mie Kariyou Corp (2000) company, reaching 5% caffeine and 13.4% tannins, based on dried extract.

There remains therefore a need for alternative methods directed to obtaining purified caffeine.

SUMMARY OF THE INVENTION

Accordingly, in a first aspect, the invention provides a method for extraction of natural caffeine from a caffeine containing biological material comprising:
(i) contacting a caffeine containing biological material with an extraction solvent
(ii) separating the solids and collecting the solvent extract
(iii) contacting the solvent extract from step (ii) with 0.1% to 15% (w/v) of MgO at a temperature from about 70° C. to about 90° C.
(iv) waiting until two phases (A and B) are formed in the mixture of step (iii) and recuperate the upper phase (phase A) containing the caffeine
(v) optionally concentrate the phase A from step (iv)
(vi) and optionally crystalize the caffeine In a second aspect, the invention provides a natural caffeine extract (or extract of the invention) obtained by the method of the invention.

In a third aspect, the invention provides the use of a natural caffeine extract of the invention in a nutraceutical formulation, a dietary, food or beverage product for humans or animals, a nutritional supplement, a sports supplement, a fragrance or flavouring, a pharmaceutical or veterinary formulation, an oenological or cosmetic formulation In a further aspect, the invention is related to a nutraceutical formulation, a dietary, food or beverage product for humans or animals, a nutritional supplement, a sports supplement, a fragrance or flavouring, a pharmaceutical or veterinary formulation, an oenological or cosmetic formulation comprising a natural caffeine extract of the invention.

The details, examples and preferences provided in relation to any one or more of the stated aspects of the present invention will be further described herein and apply equally to all aspects of the present invention. Any combination of the embodiments, examples and preferences described herein below in all possible variations thereof is encompassed by the present invention unless otherwise indicated herein, or otherwise clearly contradicted by context.

DETAILED DESCRIPTION OF THE INVENTION

It is to be understood that both the foregoing general description and the following detailed description are exemplary and explanatory only and are not restrictive of the embodiments, as claimed. Herein, the use of the singular includes the plural unless specifically stated otherwise. As used herein, the use of "or" means "and/or" unless stated otherwise. Furthermore, the use of the term "including" as well as other forms, such as "includes" and "included", is not limiting.

The section headings used herein are for organizational purposes only and are not to be construed as limiting the subject matter described. All documents, or portions of documents, cited in this application, including, but not limited to, patents, patent applications, articles, books, etc are hereby expressly incorporated by reference for the portions of the document discussed herein, as well as in their entirety.

Purified Natural Caffeine and Method for Extraction of Purified Natural Caffeine.

According to the present invention, there is provided a method for extraction of natural caffeine from a caffeine containing biological material comprising:
(i) contacting a caffeine containing biological material with an extraction solvent
(ii) separating the solids and collecting the solvent extract
(iii) contacting the solvent extract from step (ii) with 0.1% to 15% of MgO (w/v) at a temperature from about 70° C. to about 90° C.
(iv) waiting until two phases (A and B) are formed in the mixture of step (iii) and recuperate the upper phase (phase A) containing the caffeine
(v) concentrate the phase A from step (iv)
(vi) and optionally crystalize the caffeine Step (v) may be optional since the phase A containing the caffeine obtained in step (iv) may be used as such.

Thus, According to the present invention, there is provided a method for extraction of natural caffeine from a caffeine containing biological material comprising:
(i) contacting a caffeine containing biological material with an extraction solvent
(ii) separating the solids and collecting the solvent extract
(iii) contacting the solvent extract from step (ii) with 0.1% to 15% of MgO (w/v) at a temperature from about 70° C. to about 90° C.
(iv) waiting until two phases (A and B) are formed in the mixture of step (iii) and recuperate the upper phase (phase A) containing the caffeine
(v) optionally concentrate the phase A from step (iv)
(vi) and optionally crystalize the caffeine.

"Biological" refers to the mass of living organisms (such as plant biological material, animal biological material and/or prokaryotic biological material).

As used herein, the term "plant biological material" is material that has been obtained from or is obtainable from plants or algae, such as from plant roots and/or the aerial parts of the plant, such as leaves, flowers, stems, barks, fruits or seeds or their tissues. For example, the plant biological material may be obtained from the fruits of the plant. Plant biological material includes also residues from agricultural harvesting and industrial processing of said materials.

As used herein, the term "animal biological material" is material that has been obtained from or is obtainable from an animal source, such as from secretions from the glands of mammals.

As used herein, the term "prokaryotic biological material" is material that has been obtained from or is obtainable from single cell organisms, such as bacteria.

"Caffeine containing biological material" means that the biological extract comprises about 0.05% or more by weight of caffeine.

For example, the caffeine containing biological material may comprise about 2% or more, about 5% or more, about 10% or more, about 20% or more, or about 40% or more by weight of caffeine.

The caffeine containing biological material is preferably plant biological material. The plant biological material may be obtained from or obtainable from plant roots and/or plant aerial parts, such as the leaves, flowers, stems, barks, fruits and/or seeds, their tissues (such as the rind of the fruit) or mixtures thereof. For example, the plant biological material may be the leaves of the plant.

Non-limitative examples of caffeine containing plant biological material are coffee grains, guarana fruits, Kola nuts (*Cola acuminata*), tea leaves, cocoa, mate leaves (genus lies such as *I. paraguariensis*) etc. Usable tea leaves, more specifically, include tea leaves prepared from tea leaves of the Genus *Camellia*, for example, *C. sinensis, C. assamica* and the *Yabukita* variety, or their hybrids. Such prepared tea leaves include green teas such as sencha (middle grade green tea), bancha (coarse green tea), gyokuro (shaded green tea), tencha (powdered tea) and kamairicha (roasted tea) semi-fermented teas represented by oolong tea, and fermented teas such as black tea. In a preferred embodiment, the caffeine containing plant biological material is guarana seeds/fruits.

The guarana (*Paullinia cupana* Kunth ex H.B.K. var *sorbilis* (Mart.) Ducke, Sapindaceae family) is a woody creeper original from Central Amazon, which can become 10 m high, generating bunches with until 50 fruits, each with one to three seeds. The seed high caffeine content that can varies from 2.5 to 6%. The caffeine content in guarana is significantly higher (4 times) than it is in coffee, 10 times higher than it is in tea and 39 times higher than cacao. (EDWARDS et al., 2005).

As will be appreciated by the person skilled in the art, as used herein the term "obtainable from" means that the plant and/or animal and/or prokaryotic biological material may be obtained from a plant/animal/prokaryote directly or may be isolated from the plant/animal/prokaryote, or may be obtained from an alternative source, for example by chemical synthesis or enzymatic production. Whereas the term "obtained" as used herein, means that the extract is directly derived from the plant/animal/prokaryote source.

As such, the methods and uses described herein may include before step (i) the preparation of the caffeine-containing biological material. For example the caffeine-containing biological material can be cleaned, dried, milled, etc before the extraction process. Typically the cleaning is performed with water.

Also, the caffeine-containing biological material, such as guarana seeds, can be dried before the extraction of the caffeine with the method of the invention. Different drying methods are known by the person skilled in the art that would not alter the quantity and quality of the caffeine contained in the caffeine containing biological material. Examples of drying methods are drum drying, sun drying, natural stove etc.

The caffeine containing biological material can be milled or grounded so as to obtain smalls particles. Typically, the caffeine containing biological material, such as the guarana seeds, are milled into granules to increase the surface area for the solvent to contact and to increase extraction efficiency, having the granules a particle size in a range from about 0.1 to about 0.5 cm.

In a first step (i) of the method of the invention, the caffeine containing biological material, such as guarana seeds (more preferably milled or grounded dried guarana seeds) is contacted with an extraction solvent.

The caffeine containing biological material is contacted in step (i) with an extraction solvent.

The solvent used in the method of the invention can be any solvent that solubilised caffeine from the caffeine-containing biological material. The suitable solvent can be aqueous, alcoholic, organic solvent soluble in water or a combination thereof.

Particular solvents that may be used in the extraction process include alcohols (such as methanol), and alcohol/water mixtures (such as mixtures of methanol and water). For example, the extraction solvents can be water, a water-alcohol mixture (from about 1% to about 99% alcohol in water. For example, from about 30% to about 75% alcohol in water, or from about 30% to about 50% alcohol in water, such as from about 35% or from about 40% alcohol in water), or alcohol. Particular alcohols that may be mentioned include ethanol (EtOH) and methanol (MeOH).

In particular embodiments, the extraction solvent may be an ethanol-water mix, such as from about 30% to about 75% ethanol in water, or from about 30% to about 50% ethanol in water. For example, from about 35% or from about 40% ethanol in water to about 75% ethanol in water.

In a preferred embodiment, the solvent is an aqueous solvent with more than about 90% water, more than about 95% water, more that about 99'5% water, more than about 99.9% water. In a preferred embodiment the solvent is water (100%). The water used as solvent in the present invention is preferably filtered water, ultrapure water or highly purified water (HPW).

For example the method of the invention may comprise or consist of:
(i) contacting a caffeine containing biological material such as milled or grounded guarana seeds with an extraction solvent such as water
(ii) separating the solids and collecting the solvent extract
(iii) contacting the solvent extract from step (ii) with 0.1% to 15% (w/v) of MgO at a temperature from about 70° C. to about 90° C.
(iv) waiting until two phases (A and B) are formed in the mixture of step (iii) and recuperate the upper phase (phase A) containing the caffeine
(v) optionally concentrate the phase A from step (iv)
(vi) and optionally crystalize the caffeine.

The step (i) of the method of the invention can be performed a different temperatures such as at a temperature from about 50° C. to about to 100° C.

Typically, the ratio of biological material to solvent mixture used in the extraction process varies from about 1:1 to about 1:10 on a gram to litter basis, such as from about 1:3 to about 1:8. In a preferred embodiment the ration of biological material to solvent is from 1:5.

The incubation period (i.e. the period during which the biological material such as guarana seed is in contact with the solvent) is typically from about 2 hours to about 24 hours.

After the caffeine containing biological material and solvent have been incubated in step (i) the solvent containing the caffeine is separated from residual solid biological material (such as residual solids from guarana fruits).

In step (ii) any solid biological material present in the solution obtained in step (i) may be removed by any means known in the art, for example by filtration, static of dynamic decantation, drainage, and/or centrifugation.

In a preferred embodiment first a decantation is used followed by a rotary filter where the solvent extract obtained in step (ii) goes through a polyester mesh of 30 μm.

The solids removed by any means known in the art can be incubated again with new solvent (such as water) for improving the extraction of the caffeine. In a preferred embodiment the steps (i) and (ii) are repeated more than 2, more than 3, more than 4, more than 5, more than 6, more than 10 times. In more preferred embodiment, the steps (i) and (ii) are repeated 4 times and the incubation time is of at least 1 hour, at least 2 hours, at least 3 hours, at least 5 hours, at least 24 hours. In a preferred embodiment steps (i) and (ii) are repeated 4 times and the incubation time is about or more of 2 hours.

For avoidance of doubt, if the steps (i) and (ii) are performed more than one time, the solvent extract obtained in step (ii) of each repetition will be collected and used in next step (iii).

The step (i) can be performed at a temperature from about 50° C. to about 100° C., from about 50, 51, 52, 53, 54, 55, 56, 57, 58, 59, 60, 61, 62, 63, 64, 65, 66, 67, 68 or about 69° C. to about 100, 99, 98, 97, 96, 95, 94, 93, 92, 91, 89, 88, 87, 86, 85, 84, 83, 82, 81, 80, 79, 78, 77, 76, 75, 74, 73, 72, 71 or about 70° C.

The inventors have surprisingly found that the caffeine extraction yield and the purity of the caffeine are increased if in step (i) if the temperature used is progressively increased. Thus in a preferred embodiment, step (i) is performed at a temperature that is progressively increased from about 50° to 100°. The increase in temperature can be gradually during the time from 50 to 100°.

In one embodiment the temperature in step (i) is first from about 60±10° C. (from about 50 to about 70° C.), then increased to about 70±10° C. (from about 60 to about 80° C.), then increased to about 80±10° C. (from about 70 to about 90° C.) and a finally increased to about 90±10° C. (from about 80 to about 100° C.).

In another embodiment the temperature used in step (i) is first from about 60±5° C. (from about 55 to about 65° C.), then increased to about 75±5° C. (from about 70 to about 75° C.), then increased to about 85±5° C. (from about 80 to about 90° C.) and a finally increased to about 955° C. (from about 90 to about 100° C.). In a more preferred embodiment the temperature is first about 60° C., then about 75° C., then about 85° C. and then about 85° C.

Each step of temperature (i.e 60±5° C., 75±5° C., 85±5° C. and 95±5° C.) can be of same duration (such as from about 0.5 to about 2 hours) or of different duration (for example, 60±5° C. about 30 minutes, 75±5° C. about 1 hour, 85±5° C. about 30 minutes and 95±5° C. about one hour).

In an embodiment, step (i) the temperature used is first about 60±5° C. for at least 1 hour, 75±5° C. for at least 1 hour, 85±5° C. for at least 1 hour and 95±5° C. for at least 1 hour. In a more preferred embodiment the temperature is first about 60° C. for at least 1 hour, then about 75° C. for at least 1 hour, then about 85° C. for at least 1 hour and then about 85° C. for at least 1 hour. In a preferred embodiment the incubation time is of at least 2 hours.

For example the method of the invention may comprise or consist of:
(i) contacting a caffeine containing biological material (such as milled or grounded guarana seeds) with an extraction solvent (such as water) at a temperature that is progressively increased from about 50° to 100° (such as first about 60±5° C., then about 75±5° C., then about 85±5° C., and then about 95±5° C.)
(ii) separating the solids and collecting the solvent extract
(iii) contacting the solvent extract from step (ii) with 0.1% to 15% (w/v) of MgO at a temperature from about 70° C. to about 90° C.
(iv) waiting until two phases (A and B) are formed in the mixture of step (iii) and recuperate the upper phase (phase A) containing the caffeine
(v) optionally concentrate the phase A from step (iv)
(vi) and, optionally crystalize the caffeine For example the method of the invention may comprise or consist of:
(i) contacting a caffeine containing biological material (such as milled or grounded guarana seeds) with an extraction solvent (such as water) at a temperature that is progressively increased from about 50° to 100° (such as first about 60±5° C. for at least 1 hour, 75±5° C. for at least 1 hour, 85±5° C. for at least 1 hour and 95±5° C. for at least 1 hour)
(ii) separating the solids and collecting the solvent extract
(iii) contacting the solvent extract from step (ii) with 0.1% to 15% (w/v) of MgO at a temperature from about 70° C. to about 90° C.
(iv) waiting until two phases (A and B) are formed in the mixture of step (iii) and recuperate the upper phase (phase A) containing the caffeine
(v) optionally concentrate the phase A from step (iv)
(vi) and optionally crystalize the caffeine If several repetitions of step (i) and (ii) are preformed, the temperature can be the same in each of the repetitions or can be different.

In a preferred embodiment the step (i) and (ii) are repeated four times, the first repetition is at a temperature from about 60±5° C., the second repetition at a temperature from about 75±5° C., the third repetition at a temperature from about 855° C. and a fourth repetition at a temperature from about 95±5° C. In a more preferred embodiment first repetition is about 60° C., the second repetition at about 75° C., the third repetition at about 85° C. and the fourth repetition at about 85° C. In a preferred embodiment each incubation time for each repetition is of at least one hour, in a more preferred embodiment each incubation time for each repetition is of at least two hours.

For example the method of the invention may comprise or consist of:
(i) contacting a caffeine containing biological material (such as milled or grounded guarana seeds) with an extraction solvent (such as water) at a temperature that is progressively increased from about 50° to 100°
(ii) separating the solids and collecting the solvent extract
(iii) contacting the solvent extract from step (ii) with 0.1% to 15% (w/v) of MgO at a temperature from about 70° C. to about 90° C.
(iv) waiting until two phases (A and B) are formed in the mixture of step (iii) and recuperate the upper phase (phase A) containing the caffeine
(v) optionally concentrate the phase A from step (iv)
(vi) and optionally crystalize the caffeine, wherein the step (i) and (ii) are repeated four times, the first repetition is at a temperature from about 60±5° C., the second repetition at a temperature from about 75±5° C., the third repetition at a temperature from about 85±5° C., and a fourth repetition at a temperature from about 95±5° C.

For example the method of the invention may comprise or consist of: (i) contacting a caffeine containing biological material (such as milled or grounded guarana seeds) with an extraction solvent (such as water) at a temperature that is progressively increased from about 50° to 100°
(ii) separating the solids and collecting the solvent extract
(iii) contacting the solvent extract from step (ii) with 0.1% to 15% (w/v) of MgO at a temperature from about 70° C. to about 90° C.
(iv) waiting until two phases (A and B) are formed in the mixture of step (iii) and recuperate the upper phase (phase A) containing the caffeine
(v) optionally concentrate the phase A from step (iv)
(vi) and optionally crystalize the caffeine, wherein the step (i) and (ii) are repeated four times, the first repetition is at a temperature from about 60±5° C. for at least 2 hours, the second repetition at a temperature from about 75±5° C. for at least 2 hours, the third repetition at a temperature from about 855° C. for at least 2 hours, and a fourth repetition at a temperature from about 955° C. for at least 2 hours.

In one embodiment, the extraction of the natural caffeine is performed in the absence of any exogenous enzymes or enzymatic treatment.

A third step of the method of the invention comprises contacting the solvent extract from step (ii) with 0.1% to 15% of MgO (w/v). In a preferred embodiment the magnesium oxide (MgO) has a purity of at least 98%. The inventors have observed that with lower purities the reaction will not perform in an effective way.

The MgO is from about 0.1, 0.5, 1, 1.5, 2, 2.5, 3, 3.5, 4, 4.5, 5, 5.5, 6 or 6.5% (w/v) to about 15, 15.5, 14, 15.5, 13, 13.5, 12, 12.5, 11, 11.5, 10, 10.5, 9, 9.5, 8, 8.5, 6, 7 or 7.5% (w/v) based on the total amount of solvent extract from step (ii).

In one embodiment, the MgO concentration is less than 9%, such as less than 8%, such as less than 7%, such as less than 6%, such as less than 5%, such as less than 4.5%, such as less than 4%, such as less than 3.5% (w/v). In another embodiment, the MgO concentration is from 1% to about 7.5%, such as from 0.5% to 5%, such as from 1% to 4% (w/v). In a preferred embodiment, MgO is from about 2.5% to about 3.0% (w/v) based on the total amount of solvent extract from step (ii).

The inventors have surprisingly found that the caffeine extraction yield and the purity of the caffeine is increased if in step (iii) the temperature of the reaction is from about 70° C. to about 90° C. In a preferred embodiment, the temperature of the reaction is from about 75±5° C.

For example the method of the invention may comprise or consist of:
(i) contacting a caffeine containing biological material (such as milled or grounded guarana seeds) with an extraction solvent (such as water) at a temperature that is progressively increased from about 50° to 100°
(ii) separating the solids and collecting the solvent extract
(iii) contacting the solvent extract from step (ii) with 0.1% to 15% (w/v) of MgO (such as 2.5 to 3% of MgO) at a temperature from about 70° C. to about 90° C. (such as about 75±5° C.)
(iv) waiting until two phases (A and B) are formed in the mixture of step (iii) and recuperate the upper phase (phase A) containing the caffeine (v) optionally concentrate the phase A from step (iv)

(vi) and optionally crystalize the caffeine, wherein the step (i) and (ii) are repeated four times, the first repetition is at a temperature from about 60±5° C. for at least 2 hours, the second repetition at a temperature from about 75±5° C. for at least 2 hours, the third repetition at a temperature from about 855° C. for at least 2 hours, and a fourth repetition at a temperature from about 955° C. for at least 2 hours.

The incubation period in step (iii) (i.e. the period during which the solvent extract is in contact with the MgO) is typically from about 0.5 hours to about 24 hours. In a preferred embodiment the incubation period in step (iii) is from 0.5 hours to about 1.5 hours.

Mechanical energy can be applied to the mixture of step (i) and/or to the mixture of step (iii).

Applying mechanical energy in the method homogenizes the mixture, changes the physical structure of the starting caffeine-containing biological material and increases the extraction yields of caffeine. The amount of mechanical energy applied in the method depends on at which step applied, the type of starting caffeine-containing biological material, the amount of the starting caffeine-containing biological material used in the mixture, the pH of the mixture, and the temperature of the mixture. The amount of mechanical energy also can influence the amount of time needed to complete the extraction of the caffeine from the caffeine-containing biological material.

For example, in step (i) or step (iii) of the method of the invention, the biological material (such as milled guarana seeds) and the extraction solution (such as water) may be mixed using techniques known in the art, for example using stirring, maceration, percolation or infusion, such as magnetic or mechanical stirring.

Stirring may be conducted at any suitable revolution per minute (rpm), for example, the stirring may be done from about 1 rpm or about 10 rpm or about 50 rpm to about 500 rpm. For mechanical stirring this may typically be done from about 1 rpm to 500 rpm, such as from about 10 rpm to about 200 rpm.

Devices for applying mechanical energy can be a pump, a refiner, a homogenizer, an extruder, a lobe pump, and/or a centrifugal pump. The mixture can be circulated in a closed-loop system that includes a pressure vessel (able to contain a heated solvent mixture), a reflux vessel, a heat exchanger, such as a shell and tube heat exchanger, and a pump for recirculating the heated mixture back to the vessel, allowing multiple passes through the pump in the system. Any pump that can exert a mechanical energy, such as a bi-axial extensional stress, on the fluid as it passes through the pump or through the system can be used. Examples include rotary lobe pumps (available from, e.g., Viking Pump, Inc., Cedar Falls, Iowa; Johnson Pump, Rockford, Ill.; and Wright Flow Technologies, Inc., Cedar Falls, Iowa); centrifugal pumps, and hydro-transport pumps (available from, e.g., Cornell Pump Company, Clackamas, Oreg.; and Alfa Laval Inc., Richmond. Va.). Other devices that can be used singularly or in combination to impart mechanical energy, such as a bi-axial extensional stress, include a plate refiner, a disc refiner, a conical refiner, a hydropulper, an extruder, a friction grinder mill, a hammer mill, and a ball mill. Steam explosion or pressure relief also can be used to impact mechanical energy. The methods can be designed as continuous without circulating back to the pressure vessel.

The pump can be a rotary lobe pump, alone or in combination with another type of pump. The rotary lobe pump is a positive displacement pump and can have a single lobe, bi-wing, tri-lobe, or multi-lobe configuration. During operation, two rotors mesh together and rotate in opposite directions, forming cavities between the rotors and the housing of the pump. The mixture enters and fills the cavities, moving through the pump between the lobes and the casing. The movement of the lobes of the pump forces the mixture through the outlet port of the discharge side of the pump and the mixture is ejected from the pump. The movement of the mixture through the pump exposes the mixture to mechanical energy.

Mechanical energy as used herein is defined either in kilojoules (kJ) per kilogram dry matter (DM) in the mixture or as kilojoules per kilogram of the mixture (i.e. the slurry containing the starting caffeine-containing biological material. Specifying the energy input per kg dry matter is independent of the total weight of the mixture being mixed. The amount of mechanical energy applied can be at or about 800 kilojoules or greater per kg dry matter, or in the range of from at or about 800 to at or about 15,000 kJ/kg dry matter. The mechanical energy to which the mixture can be subjected can be from 800 kJ/kg to 15,000 kJ/kg, from 5,000 kJ/kg, to 13,200 kJ/kg. For example, for 1 kg material (dry weight basis) in 30 litters of aqueous solvent processed through a lobe pump (APV type, CL/1/021/10) with a pump motor that is 2 kW at 50 Hz that operated at 10 Hz (0.4 kW) for a period of 50 minutes (3000 seconds), the energy imparted to the sample was 0.4 kW×3000 seconds or 1200 kilojoules (per kg dry matter). Mechanical energy for the mixture can be at or about 36 kilojoules or greater per kilogram of the mixture, at or about 40 kilojoules or greater per kilogram of the mixture, or at or about 60 kilojoules or greater per kilogram of the mixture, and can often range up to at or about 150 kilojoules (or 200 kilojoules, or 400 kilojoules, or 600 kilojoules) per kilogram of the mixture.

The mechanical energy (i.e mixing) applied in step (i) and/or step (iii) of the method of the invention may be at a pressure of from about 10 bar (1000 KPa) to about 1000 bar (100000 KPa) or from about 20 bar (2000 KPa) to about 100 bar (10000 KPa).

The mechanical energy (i.e mixing) applied in step (i) and/or step (iii) of the method of the invention may be applied during the whole step (i) and/or (iii) or only during a part of said steps (i) and/or (iii). The duration can be of from about 1 minute to about 5 hours, such as from about 5 minutes to about 1 hour or from about 5 minutes to about 30 minutes.

The inventors have observed that the mixture obtained in step (iii) will form two phases if not longer a mechanical energy is applied. Thus, step (iv) consist of waiting until two phases are formed in the mixture of step (iv) and recover the upper phase (phase A) containing the caffeine.

The upper phase (A) can have a transparent aspect and contains the solvent (such as water) and dissolved caffeine while the lower phase (B) looks like sludge and contains other biological material (such as guarana) substances such as tannins, etc.

Optionally, the lower phase (phase B) can be washed several times with new solvent (such as water) and the step (iv) can be repeated. This will allow recovering the small amounts of caffeine that eventually are in phase B and will increase the yields.

The upper phase (A) has a clear, transparent appearance and contains the caffeine. This phase A may be used as such or may be further concentrate and/or may be crystalize to obtain a caffeine concentrate or a highly purified caffeine extract.

Step (v) consist in concentrate the phase A from step (iv). Further, the concentrate of step (v) may be submitted to a crystallization process to form caffeine crystals that comprises caffeine highly purified.

For concentrate, (i. e evaporate) the solvent from the mixture recovered in step (iv) (phase A), any method known in the art can be used. For example, falling film evaporator, spray-drying, freeze-drying or vacuum drying can be used to concentrate the phase A. In a preferred embodiment, the solvent (such as water) is evaporated until 8-10% of total solids are reached in the concentrated.

In a preferred embodiment, the phase A is concentrated at 805° C. in a falling film evaporator.

The caffeine concentrate extract obtained in step (v) can be use in several applications described below, or can be further purified.

The caffeine concentrate extract obtained in step (v) already contain highly purified caffeine with less than 10%, less than 9%, less than 8%, less than 7%, less than 6%, less than 5%, less than 4%, less than 3%, less than 2%, less than 1% or less than 0.5% of impurities (i.e other molecules that are not caffeine such as tannins etc).

In one embodiment the concentrate extract in liquid form has a ration of caffeine impurities (including tannins) of more than 19, such as more than 25, such as more than 32.

In a particular embodiment, the caffeine concentrate extract obtained in step (v) (or concentrate of the invention) can be dried, for example by spray drying or other techniques well known in the art.

After concentration, optionally caffeine crystals can be formed (step vi) to further concentrate the caffeine. In a preferred embodiment caffeine crystals are formed. For forming caffeine crystals the concentrate obtained in step (v) is cooled down (for example in an water cooler crystalizing tank or cooling tank) until caffeine crystals are formed (for example until the temperature reaches from about 3° C. to about 25° C., from about 5° C. to about 10° C.)

When caffeine crystals are formed, they can be oven dried, for example at about 105° C. The crystals thus obtained have a very high purity of caffeine.

For example the method of the invention may comprise or consist of:
(i) contacting a caffeine containing biological material (such as milled or grounded guarana seeds) with an extraction solvent (such as water) at a temperature that is progressively increased from about 50° to 100°
(ii) separating the solids and collecting the solvent extract
(iii) contacting the solvent extract from step (ii) with 0.1% to 15% (w/v) of MgO (such as 2.5 to 3% of MgO) at a temperature from about 70° C. to about 90° C. (such as about 75±5° C.)
(iv) waiting until two phases (A and B) are formed in the mixture of step (iii) and recuperate the upper phase (phase A) containing the caffeine
(v) concentrate the phase A from step (iv)
(vi) and crystalize the caffeine, wherein the step (i) and (ii) are repeated four times, the first repetition is at a temperature from about 60±5° C. for at least 2 hours, the second repetition at a temperature from about 75±5° C. for at least 2 hours, the third repetition at a temperature from about 85±5° C. for at least 2 hours, and a fourth repetition at a temperature from about 95±5° C. for at least 2 hours.

Optionally, after the crystallization, the caffeine crystals can be washed with cold water to increase the purity of the crystals and remove any impurities left. Cooled water can be used to wash the crystals. The water has to be at a temperature that not allows the solubilisation of the caffeine (such as about 5° C.).

Finally the crystals can be dried to evaporate any water left in said crystals. In a preferred embodiment, the crystals are oven dried at 105±5° C. in a stove from 10 to 15 hours with air circulation to evaporate the water left in the crystals resulting in purified caffeine.

The efficiency of the method of the invention is of more than 40%, such as more than 60% such as more than 70%.

As mentioned before, the natural caffeine produced by the method of the first aspect of the invention, can be a concentrate extract obtained in step (v), thus the present invention also provides natural caffeine concentrate (natural caffeine concentrate of the invention) obtained by the method of the invention.

In a preferred embodiment, the natural caffeine obtained by the method of the invention is obtained from guarana seeds.

The natural caffeine concentrate of the invention comprises from about 5% to about 100% of caffeine, such as from about, 5%, 10, 11, 12, 13, 14, 15, 16, 17, 18, 19, 20, 30, 40, 45, 55, 60, 65, 70, 75, 80, 85, 90, 95, or about 99% to about 95%, 90, 85, 80, 75, 70, 65, 60, 55, 50, 40, 30, 20 or about 10% of caffeine of total weight.

The natural concentrate of caffeine of the invention can be further dried (i.e evaporate all the solvent) for example by spray drying. The concentrate of the invention can also be used before the filtration/crystal formation step, in this condition the liquid base concentrate has may have from about 8 to about 12% of total solids of which: from about 3.6 to about 7.2% are caffeine; from about 4.4 to about 4.8% are other guarana solids and from about 88 to about 92% water.

The natural concentrate of the invention (before crystallization) can be mixed with drying aids such as maltodextrin proportionally to any value less than 50% of caffeine for subsequent drying, obtaining extracts more diluted than the total process that generates the purified crystal at min. 95% purity.

In a preferred embodiment, the natural caffeine produced by the method of the first aspect of the invention, can be a concentrate extract obtained in step (v) that is crystalized to form caffeine crystals and a caffeine extract (or crystalized caffeine extract) highly purified as detailed before.

Thus, the present invention also provides a natural caffeine extract highly purified or "natural caffeine extract highly purified of the invention or natural caffeine extract of the invention" that is obtained after crystallization. In a preferred embodiment, the natural caffeine extract obtained by the method of the invention is obtained from guarana seeds.

The natural caffeine extract highly purified of the invention may comprises or consist of from about 40% to about 100% of caffeine, such as from about 40, 45, 55, 60, 65, 70, 75, 80, 85, 90, 95, or about 99 to about 95, 90, 85, 80, 75, 70, 65, 60, 55 or 50% of caffeine of total weight. In a preferred embodiment, the caffeine purify of the extract is from about 95% to about 100%. In another embodiment, the caffeine purity is of more than 90%, such as more than 92%, more than 94%, more than 95%, more than 96%, more than 97%, more than 98% or 100%. In a preferred embodiment the caffeine is essentially pure and has no residual magnesium oxide.

The natural caffeine extract highly purified of the invention obtained in step (v) after crystallization (or crystalized caffeine extract) is highly purified and has a caffeine purity is of more than 90%, such as more than 92%, more than 94%, more than 95%, more than 96%, more than 97%, more than 98% or 100%. The natural caffeine extract obtained in step (v) after crystallization has less than 10%, less than 9%, less than 8%, less than 7%, less than 6%, less than 5%, less than 4%, less than 3%, less than 2%, less than 1% or less than 0.5% of impurities (i.e other molecules that are not caffeine such as tannins etc).

In one embodiment the concentrate extract in liquid form has a ration of caffeine/impurities (including tannins) of more than 19, such as more than 25, such as more than 32.

The natural caffeine concentrate of the invention or the natural caffeine extract highly purified of the invention can reach about 95% to about 100% purity, preferably about 98% to about 100% purity and is essentially free of residual magnesium oxide.

Food or Beverage Product

The "natural caffeine" produced by the method of the first aspect of the invention can be a natural caffeine concentrate of the invention or a natural caffeine extract of the invention. Said natural caffeine is of substantially high purity. In a preferred embodiment, natural caffeine produced by the method of the first aspect of the invention is obtained from guarana seeds. The high purity is advantageous because it allows the natural caffeine to be used in various applications without further purification and/or refinement. Uses of caffeine are far-reaching and include the pharmaceutical, nutritional and cosmetic sectors. One particular advantage of the caffeine extract or of the caffeine concentrate obtained by the method of the present invention is that it is food-grade.

As mentioned before, the natural caffeine produced by the method of the first aspect of the invention, can be a concentrate extract obtained in step (v) (concentrate of the invention) and it can be use directly in several applications (such as nutraceutical formulation, a dietary, food or beverage product for humans or animals (such as functional food formulations, i.e. food, drink, feed or pet food or a food, drink, feed or pet food supplements), a nutritional supplement, a sports supplement, a fragrance or flavouring, a pharmaceutical or veterinary formulation, an oenological or cosmetic formulation)

In one embodiment the method of the first aspect of the invention further comprises adding the caffeine extracted in step (v) (natural caffeine concentrate of the invention or the natural caffeine extract of the invention) to a nutraceutical formulation, a dietary, food or beverage product for humans or animals (such as functional food formulations, i.e. food, drink, feed or pet food or a food, drink, feed or pet food supplements), a nutritional supplement, a sports supplement, a fragrance or flavouring, a pharmaceutical or veterinary formulation, an oenological or cosmetic formulation The present invention also provides the use of a natural caffeine concentrate of the invention or of a natural caffeine extract of the invention in a nutraceutical formulation, a dietary, food or beverage product for humans or animals, a nutritional supplement (such as functional food formulations, i.e. food, drink, feed or pet food or a food, drink, feed or pet food supplements), a sports supplement, a fragrance or flavouring, a pharmaceutical or veterinary formulation, an oenological or cosmetic formulation. In a preferred embodiment, the natural caffeine of the invention is obtained from guarana seeds.

The present invention also provides a nutraceutical formulation, a dietary, food or beverage product for humans or animals, a nutritional supplement, a sports supplement, a fragrance or flavouring, a pharmaceutical or veterinary formulation, an oenological or cosmetic formulation comprising a natural caffeine extract of the invention or a natural caffeine concentrate of the invention. In a preferred embodiment, the natural caffeine of the invention is obtained from guarana seeds.

The present invention also provides a process for producing a nutraceutical formulation, a dietary, food or beverage product for humans or animals, a nutritional supplement, a sports supplement, a fragrance or flavouring, a pharmaceutical or veterinary formulation, an oenological or cosmetic formulation comprising either supplementing a nutraceutical formulation, a dietary, food or beverage product for humans or animals, a nutritional supplement, a sports supplement, a fragrance or flavouring, a pharmaceutical or veterinary formulation, an oenological or a cosmetic formulation with a natural caffeine extract of the invention or with or a natural caffeine concentrate of the invention.

The natural caffeine extract of the invention (caffeine extract produced using the method of the invention) or a natural caffeine concentrate of the invention may be subjected to further processing before it is added to a nutraceutical formulation, a dietary, food or drink product for humans or animals, a nutritional supplement, a sports supplement, a fragrance or flavouring, a pharmaceutical or veterinary formulation, an oenological or cosmetic formulation. For example, the caffeine extract may be milled to form a powder, etc. In a preferred embodiment, the natural caffeine of the invention is obtained from guarana seeds.

By the term "adding" used herein is meant the use of the caffeine extract obtained suing the method of the invention as an ingredient of said nutraceutical formulation, a dietary, food or beverage product for humans or animals, a nutritional supplement, a sports supplement, a fragrance or flavouring, a pharmaceutical or veterinary formulation, an oenological or cosmetic formulation.

When used as an ingredient of nutraceutical formulation, a dietary, food or beverage product for humans or animals (such as functional food formulations, i.e. food, drink, feed or pet food or a food, drink, feed or pet food supplements), a nutritional supplement, a fragrance or flavouring, a pharmaceutical or veterinary formulation, an oenological or cosmetic formulation, the natural caffeine extract of the invention or a natural caffeine concentrate of the invention may be added at any appropriate step in the production process of said food or beverage product, etc. to achieve the desired effect. The caffeine may also be added in any amount suitable to bring about the desired effect.

The food or beverage product may be any food or beverage product known in the art. For example, the food or beverage product may be a coffee product, a tea beverage, a soft drink, water (e.g. bottled water), a dietary supplement, a nutritional supplement, a dairy product (e.g. yoghurt, milk powder, milk-based dessert), a cereal product, a fruit or vegetable juice product, or a confectionary product. Preferably the food or beverage product is a beverage product such as coffee, tea, a soft drink, a fruit or vegetable juice product or water (e.g. bottled water).

The compositions, or food or beverage products of the present invention may contain (e.g. may have been supplemented with) additional vitamins, minerals and micronutrients, including trace elements, in accordance with the recommendations (e.g. recommended daily intake guidelines) of government bodies.

Food encompasses the following general food categories, as defined by the Food and Drug Administration (FDA): baked goods and baking mixes, including all ready-to-eat and ready-to-bake products, flours, and mixes requiring preparation before serving; beverages, alcoholic, including malt beverages, wines, distilled liquors, and cocktail mix;

beverages and beverage bases, non-alcoholic, including only special or spiced teas, soft drinks, coffee substitutes, and fruit and vegetable flavored gelatin drinks; breakfast cereals, including ready-to-eat and instant and regular hot cereals; cheeses, including curd and whey cheeses, cream, natural, grating, processed, spread, dip, and miscellaneous cheeses; chewing gum, including all forms; coffee and tea, including regular, decaffeinated, and instant types; condiments and relishes, including plain seasoning sauces and spreads, olives, pickles, and relishes, but not spices or herbs; confections and frostings, including candy and flavored frosting, marshmallows, baking chocolate, and brown, lump, rock, maple, powdered, and raw sugars; dairy product analogs, including nondairy milk, frozen or liquid creamers, coffee whiteners, toppings, and other nondairy products; egg products, including liquid, frozen, or dried eggs, and egg dishes made therefrom, i.e., egg roll, egg foo young, egg salad, and frozen multicourse egg meals, but not fresh eggs; fats and oils, including margarine, dressings for salads, butter, salad oils, shortenings and cooking oils; fish products, including all prepared main dishes, salads, appetizers, frozen multicourse meals, and spreads containing fish, shellfish, and other aquatic animals, but not fresh fish; fresh eggs, including cooked eggs and egg dishes made only from fresh shell eggs; fresh fish, including only fresh and frozen fish, shellfish, and other aquatic animals; fresh fruits and fruit juices, including only raw fruits, citrus, melons, and berries, and home-prepared "ades" and punches made therefrom; fresh meats, including only fresh or home-frozen beef or veal, pork, lamb or mutton and home-prepared fresh meat-containing dishes, salads, appetizers, or sandwich spreads made therefrom; fresh poultry, including only fresh or home-frozen poultry and game birds and home-prepared fresh poultry-containing dishes, salads, appetizers, or sandwich spreads made therefrom; fresh vegetables, tomatoes, and potatoes, including only fresh and home-prepared vegetables; frozen dairy desserts and mixes, including ice cream, ice milks, sherbets, and other frozen dairy desserts and specialties; fruit and water ices, including all frozen fruit and water ices; gelatins, puddings, and fillings, including flavored gelatin desserts, puddings, custards, parfaits, pie fillings, and gelatin base salads; grain products and pastas, including macaroni and noodle products, rice dishes, and frozen multicourse meals, without meat or vegetables; gravies and sauces, including all meat sauces and gravies, and tomato, milk, buttery, and specialty sauces; hard candy and cough drops, including all hard type candies; herbs, seeds, spices, seasonings, blends, extracts, and flavorings, including all natural and artificial spices, blends, and flavors; jams and jellies, home-prepared, including only home-prepared jams, jellies, fruit butters, preserves, and sweet spreads; jams and jellies, commercial, including only commercially processed jams, jellies, fruit butters, preserves, and sweet spreads; meat products, including all meats and meat containing dishes, salads, appetizers, frozen multicourse meat meals, and sandwich ingredients prepared by commercial processing or using commercially processed meats with home preparation; milk, whole and skim, including only whole, low fat, and skim fluid milks; milk products, including flavored milks and milk drinks, dry milks, toppings, snack dips, spreads, weight control milk beverages, and other milk origin products; nuts and nut products, including whole or shelled tree nuts, peanuts, coconut, and nut and peanut spreads; plant protein products, including the National Academy of Sciences/National Research Council "reconstituted vegetable protein" category, and meat, poultry, and fish substitutes, analogs, and extender products made from plant proteins; poultry products, including all poultry and poultry-containing dishes, salads, appetizers, frozen multicourse poultry meals, and sandwich ingredients prepared by commercial processing or using commercially processed poultry with home preparation; processed fruits and fruit juices, including all commercially processed fruits, citrus, berries, and mixtures; salads, juices and juice punches, concentrates, dilution, "ades", and drink substitutes made therefrom; processed vegetables and vegetable juices, including all commercially processed vegetables, vegetable dishes, frozen multicourse vegetable meals, and vegetable juices and blends; snack foods, including chips, pretzels, and other novelty snacks; soft candy, including candy bars, chocolates, fudge, mints, and other chewy or nougat candies; soups, home-prepared, including meat, fish, poultry, vegetable, and combination home-prepared soups; soups and soup mixes, including commercially prepared meat, fish, poultry, vegetable, and combination soups and soup mixes; sugar, white, granulated, including only white granulated sugar; sugar substitutes, including granulated, liquid, and tablet sugar substitutes; and sweet sauces, toppings, and syrups, including chocolate, berry, fruit, corn syrup, and maple sweet sauces and toppings.

The nutraceutical formulation, a dietary, food or beverage product for humans or animals, a nutritional supplement, a sports supplement, a fragrance or flavouring, a pharmaceutical or veterinary formulation, an oenological or cosmetic formulation contains about 0.05% natural caffeine extract of the invention by weight, about 0.1% natural caffeine extract of the invention by weight, about 1% extract by weight, about 5% extract by weight, about 10% extract by weight, about 15% extract by weight, about 20% extract by weight, about 25% extract by weight, about 30% extract by weight, about 35% extract by weight, about 40% extract by weight, about 45% extract by weight, about 50% extract by weight, about 55% extract by weight, about 60% extract by weight, about 65% extract by weight, about 70% extract by weight, about 75% extract by weight, about 80% extract by weight, about 85% extract by weight, about 90% extract by weight, about 95% extract by weight, or about 99% extract by weight. In a preferred embodiment, the natural caffeine of the invention is obtained from guarana seeds.

Pharmaceutical and Nutraceutical Composition

In a further embodiment, it is provided the use of the natural caffeine extract of the invention or a natural caffeine concentrate of the invention in a pharmaceutical or nutraceutical composition.

In one embodiment, the invention comprises combining the natural caffeine extract of the invention or a natural caffeine concentrate of the invention with at least one of a pharmaceutically or nutraceutical acceptable carrier, diluent or excipient to form a pharmaceutical composition or a nutraceutical composition.

The natural caffeine extract of the invention may be combined in its dried form or after resuspension or dilution in a pharmaceutically or nutraceutical acceptable medium.

Examples of such suitable excipients for compositions described herein may be found in the "Handbook of Pharmaceutical Excipients, 2nd Edition, (1994), Edited by A Wade and P J Weller. Acceptable carriers or diluents for therapeutic use are well known in the pharmaceutical art, and are described, for example, in Remington's Pharmaceutical Sciences, Mack Publishing Co. (A. R. Gennaro edit. 1985).

Examples of suitable carriers include lactose, starch, glucose, methyl cellulose, magnesium stearate, mannitol, sorbitol and the like.

Examples of suitable diluents include ethanol, glycerol and water.

The choice of pharmaceutical (or nutraceutical) carrier, excipient or diluent can be selected with regard to the intended route of administration and standard pharmaceutical practice. The pharmaceutical compositions may comprise as, or in addition to, the carrier, excipient and/or diluent any suitable binder(s), lubricant(s), suspending agent(s), coating agent(s) and/or solubilising agent(s). Examples of suitable binders include starch, gelatin, natural sugars such as glucose, anhydrous lactose, free-flow lactose, beta-lactose, corn sweeteners, natural and synthetic gums, such as acacia, tragacanth or sodium alginate, carboxymethyl cellulose and polyethylene glycol. Examples of suitable lubricants include sodium oleate, sodium stearate, magnesium stearate, sodium benzoate, sodium acetate, sodium chloride and the like.

Preservatives, stabilisers, dyes and even flavouring agents may be provided in the composition. Examples of preservatives include sodium benzoate, sorbic acid and esters of p-hydroxybenzoic acid. Antioxidants and suspending agents may be also used. Nutritionally acceptable carriers, diluents and excipients include those suitable for human or animal consumption and that are used as standard in the food industry. Typical nutritionally acceptable carriers, diluents and excipients will be familiar to the skilled person in the art.

The present invention also provides the use of a natural caffeine extract of the invention for weight loss, increase alertness, increase sport performance, improve brain function, reduce the risk of Alzheimer and/or Parkinson disease and/or improve memory.

For the avoidance of doubt, in this specification when we use the term "comprising" or "comprises" we mean that the extract or composition being described must contain the listed ingredient(s) but may optionally contain additional ingredients. When we use the term "consisting essentially of" or "consists essentially of" we mean that the extract or composition being described must contain the listed ingredient(s) and may also contain small (for example up to 5% by weight, or up to 1% or 0.1% by weight) of other ingredients provided that any additional ingredients do not affect the essential properties of the extract or composition. When we use the term "consisting of" or "consists of" we mean that the extract or composition being described must contain the listed ingredient(s) only.

It is also intended that the terms "comprise" or "comprises" or "comprising" may be replaced with "consist" or "consisting" or "consisting essentially of" throughout the application as required

FIGURES

FIG. 1—Flowchart with each step of the process necessary to obtain 95-100% purified caffeine.

FIG. 2—Condensed tannin molecule.

FIG. 3—Caffeine molecules.

FIGS. 4a, 4b, and 4c—Different steps of the process.

FIGS. 5a, 5b, 5c and 5d—Different steps of the process.

FIGS. 6a, 6b, 6c and 6d—Different steps of the process.

FIGS. 7a, 7b, and 7c—Different steps of the process.

FIG. 8—Guarana seeds chromatogram in 270 nm.

FIG. 9—Guarana seeds scanning chromatogram from 200 to 400 nm.

FIG. 10—Drainage chromatogram in 270 nm.

FIG. 11—Drainage scanning chromatogram from 200 to 400 nm.

FIG. 12—Purified caffeine chromatogram in 270 nm.

FIG. 13—Purified caffeine scanning chromatogram from 200 to 400 nm.

EXAMPLES

1—Materials and Methods

Materials

To produce Guaranine caffeine, guarana seed (*Paullinia cupana* Kunth) from Bahia (northern region of Brazil) is used as the main raw material. Table 1 shows guarana seeds properties used.

TABLE 1

Specification of guarana seeds.

| Item | Results |
| --- | --- |
| Insoluble ash in acid (%) | 0.48-0.69 |
| Total ash (%) | 1.50-1.90 |
| Loss on drying (%) | 12.10-12.00 |
| Methylxanthines calculated a caffeine (%) | 4.77-4.80 |
| Total tannins (%) | 8.30-9.68 |
| Caffeine from HPLC analysis (%) | 3.50-4.50 |

Magnesium oxide (MgO) is also used in the process to react with guarana. MgO used is provided by KYOWA Chemical Co., Ltd (Japan), sales name: Kyowamag 150. MgO is min. 98% of purity and this is really important because the reaction will not happen if the degree of purity is less than 98%. Table 2 shows properties of magnesium oxide given by the provider of the raw material.

TABLE 2

Magnesium oxide properties.

| Item | Unit | Results | | |
| --- | --- | --- | --- | --- |
| Batches | — | 180421 | 180422 | 180423 |
| MgO (after ignited) | % | 97.6 | 97.8 | 97.9 |
| Ignition Loss | % | 4.8 | 4.7 | 4.6 |
| Drying Loss | % | 0.3 | 0.2 | 0.4 |
| $Fe_2O_3$—$Al_2O_3$ | % | 0.04 | 0.04 | 0.05 |
| Acid insoluble substances | % | 0.02 | 0.02 | 0.01 |
| Soluble matter | % | 0.75 | 0.76 | 0.65 |
| Specific surface area (BET) | $m^2/g$ | 146 | 140 | 141 |
| Apparent specific gravity | g/mL | 0.34 | 0.35 | 0.34 |
| Screen analysis on 150 μm | % | Trace | Trace | Trace |
| Screen analysis through 75 μm | % | 99.8 min | 99.7 min | 99.7 min |

Analytical Method

Highly-performance liquid chromatography method was used to quantify the amount of caffeine present in the samples. Intern method developed by GNutra qualified and authenticated was applied to the samples. The equipment used was a HPLC from Waters and the software used was Empower.

Sample Preparation (Raw Material)

Approximately 0.2 g of guarana seeds already milled was weighted and 50 mL of ultrapure water were added into a 250 mL Erlenmeyer and let into reflux for 1 hour at 70-80° C. After the solution cooled down to ambient temperature it was filtered in cotton to a volumetric flask of 100 mL. The empty volume of the flask was filled with ultrapure water. Then, the solution was filtered with a 0.45 μm membrane to a HPLC vial.

Sample Preparation (Steps of the Process)

Samples from other steps of the process were also prepared to identify the amount of caffeine. In those cases, the samples were weighted in different amounts and a dilution with ultrapure water was made. Then, the solution was filtered with a 0.45 μm membrane to a HPLC vial.

Standard Preparation

Approximately 1.0 mg of caffeine standard was weighted into a 10 mL volumetric flask. 7 mL of ultrapure water was added and the flask was put into ultrasonic bath for 30 minutes to dissolve the caffeine. After the solution cooled to ambient temperature, the flask was filled with ultrapure water and homogenized. Then, the solution was filtered into 0.45 μm membrane to a HPLC vial.

| Column | Lichrospher 100 RP-18 (125 × 4.0 mm × 5 μm) |
|---|---|
| Mobile phase | (A) Ultrapure water (B) Acetonitrile |
| Detection | 270 nm |
| Flow | 1.0 mL/min |
| Injection volume | 20 μL |
| Analysis time | 30 minutes |

Table 3 shows the conditions to the analysis.

TABLE 4

| Mobile phases were used in gradient as shown. | | |
|---|---|---|
| Time (min) | (%) A | (%) B |
| 0 | 100 | 0 |
| 10 | 90 | 10 |
| 15 | 80 | 20 |
| 20 | 100 | 0 |
| 30 | 100 | 0 |

To identify the percentage of caffeine, the equation was used.

$$(\%)\ Caffeine = \frac{A_{sample} \times M_{standard} \times P_{standard} \times D_{sample} \times 100}{A_{standard} \times D_{standard} \times M_{sample}}$$

| Simbol | Meaning |
|---|---|
| $A_{sample}$ | Sample area |
| $M_{standard}$ | Standard weight (g) |
| $P_{standard}$ | Standard purity (decimal) |
| $D_{sample}$ | Sample dilution (mL) |
| $A_{standard}$ | Standard average area |
| $D_{standard}$ | Standard dilution (mL) |
| $M_{sample}$ | Sample weight (g) |
| 100 | Coefficient to result in percentage |

Caffeine standard was injected five times in the equipment and then the samples were read.

2—Experimental Procedure of Extraction of Highly Purified Caffeine

First, the experiments were conducted in small scale at the laboratory. Then, they were executed in medium scale in a pilot plant. And finally they were conducted in industrial scale. High purify caffeine was obtained in small laboratory scale, medium scale and at industrial level (the pilot plant).

Milling

The first step of the process is milling. Guarana seeds are ground in a hammer mill with a 3 mm sieve resulting in particles with 0.1-0.3 cm of diameter.

Extraction

The ground seeds are extracted using water as solvent. For an efficient extraction it is necessary to use high temperatures, but in the beginning of the extraction it is essential that temperature is low and next to 605° C. to avoid the formation of gel from starches present in the smaller particles of the seeds generated by the milling process.

In this experiment four extractions of the same seeds are necessary to make sure that the process is optimized beginning with low temperature and increasing in the following extractions until 95° C.±5. At each extraction an amount of water is added to the seeds that represents times the amount of the seeds. Table 5 contains the conditions of all four extractions.

TABLE 5

| | Extraction conditions. | | | |
|---|---|---|---|---|
| Extraction | $1^{st}$ | $2^{nd}$ | $3^{rd}$ | $4^{th}$ |
| Temperature (° C.) | 60 ± 5 | 75 ± 5 | 85 ± 5 | 95 ± 5 |
| Time (h) | 2 | 2 | 2 | 2 |
| Agitation | Constant | Constant | Constant | Constant |

The first extraction begins with putting the milled seeds into the reactor and then adding water five times the amount of seeds. At that time, agitation is on and the temperature will rise. After 2 hours of extraction, the liquid now containing molecules of guarana will be drained through the bottom of the reactor where there is a 3-5 mm inox sieve which retains the seeds into the reactor and let the liquid get by.

Then, another amount of water (5 times the amount of seeds) is added to the same seeds, agitation is on and the temperature is higher to this second extraction following the conditions showed in Table 5. The same happens to the third extraction and the process goes on until the last extraction: after that the seeds are discarded. All of the four drainages are pulled together.

Filtration

After extraction, total drainage still contains small particles that went through the sieve, so the next step is a filtration. This happens in a rotary filter where the drainage goes through a polyester mesh of 30 μm. The bigger particles are discarded while the liquid filtered continues the process.

Reaction

Then, the filtered goes into a reactor. And to the filtered it is added 2.5-3% of magnesium oxide based on the total amount of filtered. The mixture is heated to 75±5° C. with constant stirring until the reaction takes place after about 1 hour.

In guarana extract we have caffeine and tannin molecules in solution, their structures are shown in FIG. 2 and FIG. 3, respectively. When tannins are present, part of the caffeine probably binds to the aromatic ring hydroxyl through hydrogen bonds, thus complexing and precipitating so they are not available in the solution.

When MgO is added to the drainage, Mg+2 ions are released in aqueous solution which will probably bind with the two oxygen molecules attached to the tannin ring resulting in tannin-Mg complex. When that happens, caffeine cannot combine with the tannins because they are not available anymore, so caffeine stays available and soluble in the solution without binding with the hydrogen in the tannins hydroxyl.

Separation

After one hour of reaction the stirring is turned off and the mixture rests. A separation naturally occurs and two phases appear. The upper phase is transparent and contains water and caffeine while the lower phase looks like sludge and contains other guarana substances such as tannins and a small amount of caffeine.

To recovery as many as caffeine possible, the phases are separated and the lower phase goes through a recovery.

Recovery

To recovery the caffeine in the lower phase, water is added to it. The amount of water used is the same amount of resulting lower phase. Then, there will be two phases again, upper phase with water and solubilized caffeine and the lower phase with other guarana substances and with less caffeine than before.

After that, the lower phase has no use because the amount of caffeine left there is negligible so it is discarded, but the upper phase is the main phase which has caffeine and we want to purify so this phase will join the upper phase of the reaction.

Concentration

Both upper phase from reaction and from recovery are united and then concentrated at 80±5° C. in falling film. In the equipment, water is evaporated until 8-10% of total solids are reached in the concentrated.

Cooling

After concentration, the concentrated is cooled down in an inox cooling tank until temperature reaches 5 to 10° C. and that is when caffeine crystals are formed.

Filtration

After the crystallization, washing the crystals with cold water is necessary because the purity wanted is not reached yet. Water in 5° C. is used to wash the crystals that are retained by the filter paper in a vacuum filter. In that temperature, caffeine is not solubilized but other guarana substances are and they leave the crystals with the cold water. If there is any MgO residue it will be removed as well with the water. This water can be reincorporated before concentration in other batches.

The water with other substances is discarded while the crystals continue to the final step of the process.

Oven Drying

The crystals are oven dried at 1055° C. in a stove from 10 to 15 hours with air circulation to evaporate the water left in the crystals resulting in purified caffeine 3—Results The quantity of each step of the process was weighted as well as total solids. After that, the amount of caffeine was determined through HPLC analysis in dry base for the dry crystal and in liquid base for other steps of the process. It was also possible to calculate process efficiency and the losses associated with caffeine based in the previous step. That is the percentage of caffeine that continues in the process from one step to another. The pH was also monitored during the experiments. All the results are shown in Table 6.

The ratio between the amount of raw material and the final product is 40-50 which means that to produce 1 kg of caffeine (95-100% purity) it is necessary 40-50 kg of guarana seeds.

To compare the peak of caffeine in different steps of the process, chromatogram of samples of the raw material (guarana seeds), total drainage and purified caffeine were analysed as shown in Table 6 and FIGS. 8 to 13.

TABLE 6

Results of the experiment

| Step | Amount liquid base (kg) | Total solids (%) | Caffeine content liquid base (%) | Amount dry base (kg) | Caffeine content dry base (%) | Caffeine (kg) | Process efficiency (%) | Losses (%) | Sample weight for HPLC (g) | Dilution for HPLC (mL) | pH |
|---|---|---|---|---|---|---|---|---|---|---|---|
| Raw material | 136.00 | — | — | 136.00 | 3.66 | 4.98 | — | — | 0.20 | 100.00 | 5.00 |
| Drainage 1$^{st}$ ext | 468.00 | 2.75 | 0.48-0.58 | 12.87 | 21.18 | 2.73 | 53.95-54.76 | 45.24-46.05 | 0.20 | 10.00 | 5.70 |
| Drainage 2$^{nd}$ ext | 577.00 | 0.50 | 0.19-0.26 | 2.89 | 51.76 | 1.49 | 25.20-30.00 | 70.00-74.80 | 0.30 | 10.00 | 5.30 |
| Drainage 3$^{rd}$ ext | 675.00 | 0.50 | 0.07-0.11 | 3.38 | 22.06 | 0.74 | 8.86-14.96 | 85.04-91.14 | 0.30 | 10.00 | 6.70 |
| Drainage 4$^{th}$ ext | 680.00 | 0.60 | 0.01-0.06 | 4.08 | 9.50 | 0.39 | 1.12-7.79 | 92.21-98.88 | 0.50 | 10.00 | 7.10 |
| Total drainage | 2400.00 | 1.40 | 0.18-0.20 | 33.60 | 14.29 | 4.80 | 89.22-96.43 | 3.57-19.78 | 0.30 | 10.00 | 6.20 |
| Supernatant from reaction | 1400.00 | 0.49 | 0.18-0.19 | 6.86 | 38.31 | 2.63 | 38.64-52.79 | 45.20-49.20 | 0.30 | 10.00 | 9.90 |
| Total supernatant (reaction + recovery) | 2260.00 | 0.27 | 0.11-0.18 | 6.10 | 68.33 | 4.17 | 74.36-83.77 | 14.20-18.20 | 0.30 | 10.00 | 9.20 |
| Concentrated | 83.00 | 8.70 | 2.70-6.70 | 7.22 | 54.02 | 3.90 | 76.40-80.40 | 19.60-21.60 | 0.10 | 100.00 | 9.20 |
| Washing water | 120.00 | 0.80 | 0.25-0.75 | 0.96 | 58.75 | 0.56 | 9.30-13.30 | 86.70-90.60 | 0.10 | 100.00 | 9.00 |
| Dry crystal | — | 100 | — | 3.30 | 98.00 | 3.23 | 63.00-66.00 | 33.10-37.10 | 0.01 | 100.00 | 6.40 |

4—Conclusions

The purification process removes all the dark substances that make the extract turbid and insoluble, resulting in isolated caffeine (95-100% of purity). It is an efficient alternative to obtain purified guarana caffeine from seeds with a less environmentally aggressive methodology, without using dichloromethane, with lower costs, obtaining the same degree of purity.

It may be a new commercial source of natural caffeine in addition to those traditionally used in beverage production such as coffee and green tea.

REFERENCES

ATTWOOD, T. K.; CAMMACK, R. Oxford dictionary of biochemistry and molecular biology, 2006. ISBN 0198529171.

EDWARDS, H. G. M.; FARWELL, D. W.; OLIVEIRA, L. F. C.; ALIA, J. M.; LE HYARIC, M.; AMEIDA, M. V.

FT-Raman spectroscopic studies of guarana and some extracts. Analytica Chimica Acta, Amsterdam, v. 532, p. 177-186, 2005. http://dx.doi.org/10.1016/j.aca.2004.10.055

GRASES, F.; RODRIGUEZ, A.; COSTA-BAUZA, A. Theobromine Inhibits Uric Acid Crystallization. A Potential Application in the Treatment of Uric Acid Nephrolithiasis. PloS one, 2014. 9. e111184. 10.1371/journal.pone.0111184.

PAGLIARUSSI, R. S.; BASTOS, J. K.; FREITAS, L. A. P. Fluid Bed Drying of Guarana (*Paullinia cupana* HBK) Extract: Effect of Process Factors on Caffeine Content. AAPS PharmSciTech, New York, v. 7, n. 2, p. E160-E166, Article 54, 2006. http://dx.doi.org/10.1208/pt070254.

SPENCER, C. M.; CAI, Y.; MARTIN, R.; GAFFNEY, S. H.; GOULDING, P. N.; MAGNOLATO, D.; LILLEY, T. H.; HASLAM, E. Polyphenol Complexation—Some thoughts and observations. Phytochemistry, Oxford, v. 27, n. 8, p. 2397-2409, 1988. http://dx.doi.org/10.1016/0031-9422(88)87004-3.

The invention claimed is:

1. A method for extraction of natural caffeine from a caffeine containing biological material comprising:
   (i) contacting the caffeine containing biological material with an extraction solvent;
   (ii) separating solids and collecting the solvent extract;
   (iii) contacting the solvent extract from step (ii) with 1.0% to 15% (w/v) of MgO at a temperature from about 70° C. to about 90° C.;
   (iv) waiting until two phases (A and B) are formed in the mixture of step (iii) and recovering the upper phase (phase A) containing the caffeine;
   (v) optionally concentrating the phase A from step (iv);
   (vi) and optionally crystalizing the caffeine.

2. The method according to claim 1, wherein the caffeine containing biological material is selected from guarana, coffee, tea, Kola, mate leaves and/or cocoa.

3. The method according to claim 1, wherein the caffeine containing biological material is milled or grounded dried guarana seeds.

4. The method according to claim 1, wherein the solvent is water.

5. The method according to claim 1, wherein the ratio of biological material to solvent is 1:5.

6. The method according to claim 1, wherein step (i) is performed at a temperature from about 50° C. to about 100° C.

7. The method according to claim 6, wherein the temperature gradient is progressively increased from about 50° to about 100°.

8. The method according to claim 7, wherein the temperature in step (i) is first from about 60±5° C., then increased to about 75±5° C., then increased to about 85±5° C., and finally increased to about 95±5° C.

9. The method according to claim 1, wherein steps (i) and (ii) are repeated more than one time, wherein the same material is extracted more than one time when repeating step (i), and wherein the solvent extract obtained in step (ii) of each repetition is combined and used in step (iii).

10. The method according to claim 9, wherein steps (i) and (ii) are repeated 4 times, and wherein the temperature in step (i) is from about 60±5° C. in the first repetition, then increased to about 75±5° C. in the second repetition, then increased to about 85±5° C. in the third repetition, and finally increased to about 95±5° C. in the fourth repetition.

11. The method according to claim 1 further comprising applying mechanical energy in steps (i) and/or (iii).

12. The method according to claim 1, wherein the MgO concentration in step (iii) is from about 2.5% to about 3.0% w/v.

13. The method according to claim 1, wherein the temperature in step (iii) is about 75±5° C.

14. The method according to claim 1, wherein in step (v) the phase A is concentrated at 80±5° C. in a falling film evaporator.

15. The method according to claim 1, wherein in step (vi) the crystallization of the caffeine is performed at a temperature from about 3° C. to about 25° C.

16. The method according to claim 1, wherein the extraction is performed without enzymatic treatment.

* * * * *